(12) United States Patent
Fukuda et al.

(10) Patent No.: US 11,863,681 B2
(45) Date of Patent: Jan. 2, 2024

(54) ONLINE SERVICE PROVIDING SYSTEM, IC CHIP, AND APPLICATION PROGRAM

(71) Applicant: JAPAN COMMUNICATIONS INC., Tokyo (JP)

(72) Inventors: Naohisa Fukuda, Tokyo (JP); Greg Deickman, Englewood, CO (US); Hiroaki Yokoyama, Tokyo (JP); Yasushi Shibuya, Englewood, CO (US); Masataka Hayashi, Tokyo (JP)

(73) Assignee: JAPAN COMMUNICATIONS INC., Tokyo (JP)

( * ) Notice: Subject to any disclaimer, the term of this patent is extended or adjusted under 35 U.S.C. 154(b) by 207 days.

(21) Appl. No.: 17/255,470

(22) PCT Filed: Jun. 26, 2019

(86) PCT No.: PCT/JP2019/025456
§ 371 (c)(1),
(2) Date: Dec. 23, 2020

(87) PCT Pub. No.: WO2020/004494
PCT Pub. Date: Jan. 2, 2020

(65) Prior Publication Data
US 2021/0281415 A1 Sep. 9, 2021

(30) Foreign Application Priority Data
Jun. 26, 2018 (JP) ................. 2018-121029

(51) Int. Cl.
*H04L 29/06* (2006.01)
*H04L 9/32* (2006.01)
*H04L 9/08* (2006.01)

(52) U.S. Cl.
CPC .......... *H04L 9/3226* (2013.01); *H04L 9/0825* (2013.01); *H04L 9/0861* (2013.01);
(Continued)

(58) Field of Classification Search
CPC ... H04L 9/3226; H04L 9/0825; H04L 9/0861; H04L 9/0897; H04L 9/3247;
(Continued)

(56) References Cited

U.S. PATENT DOCUMENTS 8,990,121 B1 * 3/2015 Guise ................ G06Q 20/3567
705/71
9,317,672 B2 * 4/2016 Carlson .................. G06F 21/31
(Continued)

FOREIGN PATENT DOCUMENTS

CA       2876364 A1 * 12/2013    ............. G06F 21/31
CN    101183932 A  *  5/2008
(Continued)

OTHER PUBLICATIONS

Extended European Search Report in EP Application No. 19827367.4 dated Feb. 15, 2002, 10 pages.
(Continued)

*Primary Examiner* — Sher A Khan
(74) *Attorney, Agent, or Firm* — MARSHALL, GERSTEIN & BORUN LLP

(57) ABSTRACT

When a user activates an app, user authentication by a PIN code or the like is first executed. When the user authentication is successful (that is, when it is confirmed that a party operating the app is a user), function limitation of the IC chip is released and a mode in which a function provided by the IC chip can be used is set. The app creates an electronic signature with a private key using the function of the IC chip. When the electronic signature and the user ID are sent to a server of an online service, the server verifies the electronic signature using the corresponding electronic certificate. When the user ID is confirmed to be a user ID sent from a valid user, the user is permitted to use the online service.

11 Claims, 20 Drawing Sheets

(52) U.S. Cl.
CPC .......... *H04L 9/0897* (2013.01); *H04L 9/3247* (2013.01); *H04L 9/3263* (2013.01)

(58) Field of Classification Search
CPC ............... H04L 9/3263; H04L 63/0823; H04L 63/0853; H04L 63/126; H04W 12/069; H04W 12/108; H04W 12/48
See application file for complete search history.

(56) References Cited

U.S. PATENT DOCUMENTS

| | | | |
|---|---|---|---|
| 11,356,847 B2* | 6/2022 | Tobita | H04L 67/01 |
| 2013/0141361 A1* | 6/2013 | Endo | G06F 3/04883 |
| | | | 345/173 |
| 2015/0143457 A1* | 5/2015 | Narendra | H04L 63/0853 |
| | | | 726/1 |
| 2015/0281362 A1* | 10/2015 | Shanmugam | H04L 63/0892 |
| | | | 709/217 |
| 2015/0324792 A1* | 11/2015 | Guise | G06Q 20/204 |
| | | | 705/17 |
| 2016/0012465 A1* | 1/2016 | Sharp | G06Q 20/321 |
| | | | 705/14.17 |
| 2016/0036588 A1* | 2/2016 | Thackston | H04L 63/0838 |
| | | | 713/168 |
| 2016/0205098 A1* | 7/2016 | Han | H04L 63/08 |
| | | | 713/155 |
| 2017/0270509 A1* | 9/2017 | Colegate | H04L 63/061 |
| 2017/0317990 A1 | 11/2017 | Kim et al. | |
| 2018/0005104 A1* | 1/2018 | Kawaguchi | H04L 63/105 |
| 2018/0019925 A1* | 1/2018 | Watanabe | G06F 7/588 |
| 2018/0150129 A1* | 5/2018 | Thomas | G06F 3/01 |
| 2018/0176017 A1* | 6/2018 | Rodriguez | H04L 63/20 |
| 2018/0211021 A1 | 7/2018 | Negi et al. | |
| 2018/0212947 A1* | 7/2018 | Chen | H04W 12/06 |
| 2019/0068381 A1 | 2/2019 | Takemori et al. | |

FOREIGN PATENT DOCUMENTS

| | | | | |
|---|---|---|---|---|
| CN | 101237327 A | * | 8/2008 | |
| CN | 102437914 A | * | 5/2012 | ............. H04L 63/08 |
| CN | 103268511 A | * | 8/2013 | |
| CN | 103870742 A | * | 6/2014 | ............... G01C 1/00 |
| CN | 104063650 A | * | 9/2014 | ............... G06F 21/34 |
| CN | 106961335 A | * | 7/2017 | |
| CN | 107864115 A | * | 3/2018 | ............. G06F 21/31 |
| DE | 102013022433 B3 | * | 5/2021 | ............. G06Q 20/02 |
| EP | 1680940 A1 | | 7/2006 | |
| JP | 2003-298574 A | | 10/2003 | |
| JP | 2004-102872 A | | 4/2004 | |
| JP | 2007-058455 A | | 3/2007 | |
| JP | 2009-217722 A | | 9/2009 | |
| JP | 2009-237774 A | | 10/2009 | |
| JP | 2009-267605 A | | 11/2009 | |
| JP | 2010-509838 A | | 3/2010 | |
| JP | 2011028522 A | * | 2/2011 | |
| JP | 5749222 B2 | * | 7/2015 | |
| JP | 2016-071538 A | | 5/2016 | |
| JP | 2017-157984 A | | 9/2017 | |
| WO | WO-0219648 A2 | * | 3/2002 | ............. G06Q 20/12 |
| WO | WO-2005/041608 A1 | | 5/2005 | |
| WO | WO-2008/057156 A2 | | 5/2008 | |
| WO | WO-2014196969 A1 | * | 12/2014 | ......... G06Q 20/3223 |
| WO | WO-2016089965 A1 | * | 6/2016 | ......... G06Q 20/1235 |
| WO | WO-2017/022121 A1 | | 2/2017 | |

OTHER PUBLICATIONS

Van Damme et al., "A PKI-based Mobile Banking Demonstrator", Public Key Infrastructures, Services and Applications, Springer Berlin Heidelberg, Berlin, Heidelberg, Sep. 15, 2011, pp. 147-158.
Search Report in International Application No. PCT/JP2019/025456 dated Sep. 17, 2019, 4 pages.
Office Action in JP Application No. 2020-527594 dated Aug. 29, 2023, 13 pages.

* cited by examiner

FIG.9

| IC CARD | | SIM CARD | | USER DEVICE |
|---|---|---|---|---|
| SERIAL NUMBER | MANUFACTURING NUMBER | TELEPHONE NUMBER | MANUFACTURING NUMBER | IMEI |
| 10530 | AZ003 | 090-xxxx-xxxx | ZDE21993 | xx-xxxxxx-xxxxxx-x |
| 00283 | AE112 | 080-yyyy-yyyy | YAB02871 | yy-yyyyyy-yyyyyy-y |
| 25611 | YY520 | 090-zzzz-zzzz | OPZ33910 | zz-zzzzzz-zzzzzz-z |

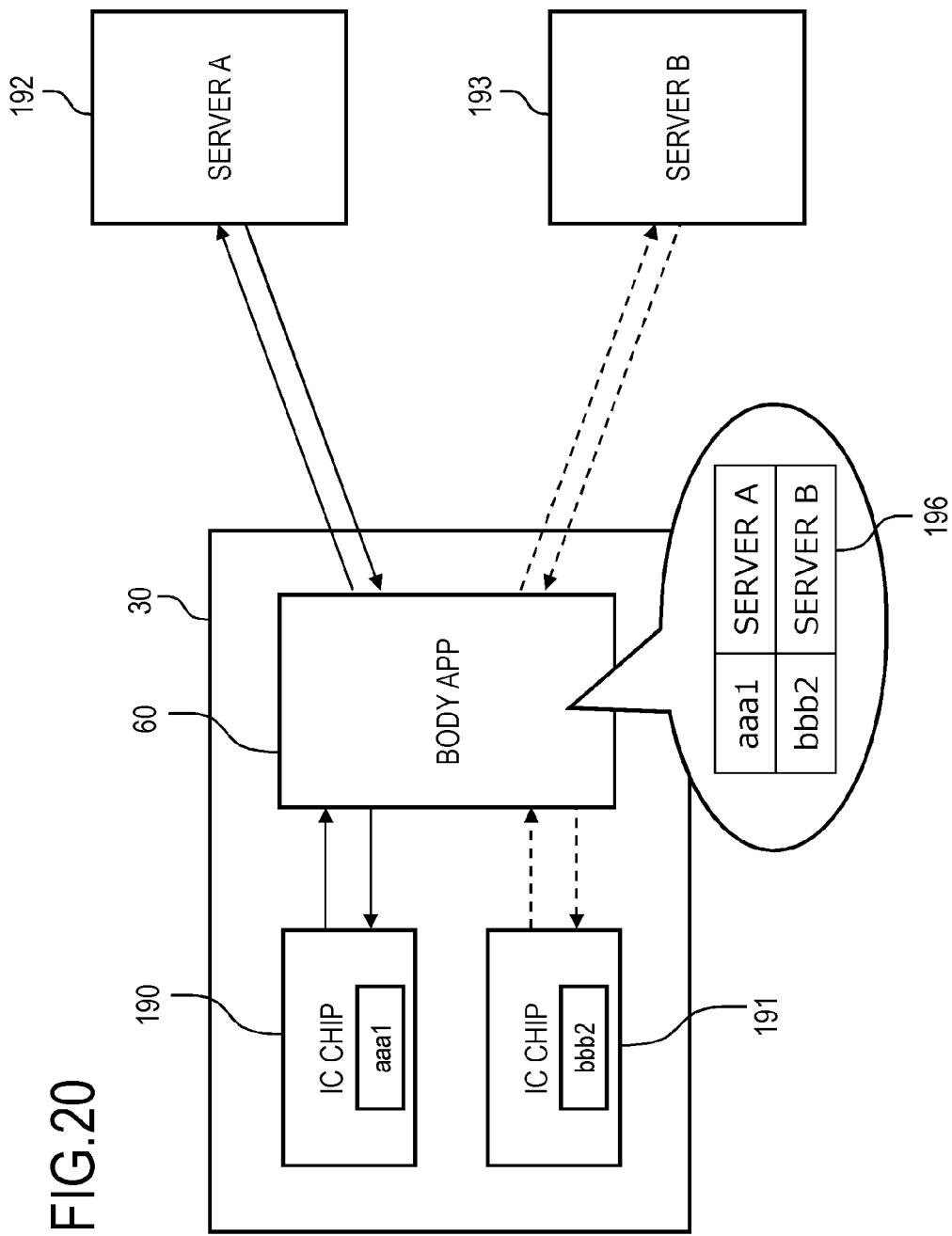

ONLINE SERVICE PROVIDING SYSTEM, IC CHIP, AND APPLICATION PROGRAM

TECHNICAL FIELD

The present invention relates to a technology for improving security when an online service is used from a portable device.

BACKGROUND ART

As the Internet has become widespread, various types of online services have been introduced and are being used by many people. On the other hand, since cyber security problems are increasing day by day, security measures are required to use online services safely and securely.

For example, the following measures are known as security measures adopted in online banking services.

(1) Measures Taken by One-Time Password Issuer

A method of using a one-time password issuer called a token is a method of distributing a token to a service user in advance and executing authentication using a one-time password created and displayed with the token when the service user logs in to a service and uses the service (see PTL 1). This method has relatively high security, for example, because a token which is a special device is necessary and a temporary password is used.

(2) Measures Taken with One-Time Password Using Mail

This is a method of executing authentication using a one-time password received by a short message service (SMS) or an e-mail at the time of login to a service. This method has high convenience because a device such as a token is not necessary.

CITATION LIST

Patent Literature

[PTL 1] Japanese Patent Application Publication No. 2016-071538

SUMMARY OF INVENTION

Technical Problem

As portable devices (mobile devices) typified by smartphones or tablet terminals become rapidly widespread, online services are in considerably broad use forms from "use in PCs in homes" to "mobile use in which portable devices are used". However, the above-described security measures are all designed on the assumption that the security measures are used in home PCs in the related art. Thus, when the security measures are applied to portable devices without change, convenience for users considerably deteriorates as a result.

For example, in the case of a method of using a token, a user has to bring the token with them at all times before going out. Further, a token differs for each service. Therefore, as the number of services to be used increases, the number of tokens to be carried also increases. Thus, the method lacks practical use. A method of receiving a one-time password by mail has high convenience because it is not necessary to carry a token. However, when a smartphone is stolen, anyone can receive mail (that is, obtain the one-time password). Therefore, there is a fundamental problem in the security measures. In an SMS or an e-mail, there is also a risk of so-called wiretapping.

In this way, as use forms of online services change from PCs to portable devices, new security measures specific to mobile uses are required early on.

The present invention has been devised in view of the foregoing circumstances and an objective of the present invention is to provide a novel security technology capable of realizing secure service uses without damaging mobile convenience.

Solution to Problem

The present invention in its first aspect provides
an online service providing system that provides a mechanism capable of using an online service safely on a portable device, the online service providing system comprising:
a service providing server configured to provide a registered user with the online service through the Internet;
an IC chip provided in a user device which is a portable device possessed by the user; and
an application program that is executed by a body processor included in the user device and causes the user device to function as a terminal using the online service,
wherein the IC chip includes;
  a memory that non-transitorily stores at least personal information used for user authentication to confirm validity of a party using the user device, a private key of the user, a public key of the user paired with the private key, and an electronic certificate of the user including the public key, and
  a processor that has at least an authentication function of executing the user authentication by collating information given from the application program with the personal information and an electronic signature function of executing an electronic signature on data given from the application program using the private key,
wherein the application program causes the user device to function as;
  a user authentication unit configured to execute the user authentication using the authentication function of the IC chip based on information acquired from the party using the user device, and
  a transmission unit configured to create the electronic signature using the electronic signature function of the IC chip in a case where the party using the user device is confirmed to be valid through the user authentication, and transmit a login request including the created electronic signature to the service providing server through the Internet, and
wherein the service providing server includes;
  a user information storage that stores the electronic certificate of the user as information regarding the user, and
  a login control unit configured to check validity of the login request by verifying the electronic signature included in the login request using the electronic certificate of the user in a case where the login request is received from the user device, and permit use of the online service on the user device in a case where the login request is confirmed to be valid.

The present invention in its second aspect provides
an IC chip used in a user device which is a portable device possessed by a user, the IC chip comprising:
a memory that non-transitorily stores at least personal information used for user authentication to confirm validity of a party using the user device, a private key of the user, a public key of the user paired with the private key, and an electronic certificate of the user including the public key, and a processor that has at least an authentication function of executing user authentication by collating information given from an application program executed by a body processor included in the user device with the personal information and an electronic signature function of executing an electronic signature on data given from the application program using the private key.

The present invention in its third aspect provides an application program that is executed by a body processor included in a user device which is a portable device possessed by a user and causes the user device to function as a terminal for utilizing an online service provided through the Internet by a service providing server, wherein the IC chip according to claim 15 is provided in the user device, and wherein the application program causes the user device to function as:

a user authentication unit configured to execute the user authentication using the authentication function of the IC chip based on information acquired from the party using the user device, and a transmission unit configured to create the electronic signature using the electronic signature function of the IC chip in a case where the party using the user device is confirmed to be valid through the user authentication, and transmit a login request including the created electronic signature to the service providing server through the Internet.

The present invention can be understood as the service providing server, the portable device including the IC card and the application program, an online service providing method including at least some of the processes, a portable device controlling method including at least some of the processes executed by the IC card and the application program, or a computer-readable storage medium that stores the application program non-transitorily.

Advantageous Effects of Invention

According to the present invention, it is possible to provide a novel security technology capable of realizing secure service uses without damaging mobile convenience.

BRIEF DESCRIPTION OF DRAWINGS

FIG. 9 is a diagram illustrating a data structure of an IC card management database.

FIG. 20 is a diagram illustrating an example of a mechanism for identifying an IC chip used in a user device when communication is executed between a user device and a server.

DESCRIPTION OF EMBODIMENTS

<Overview of Online Service Providing System>

Figure 1:
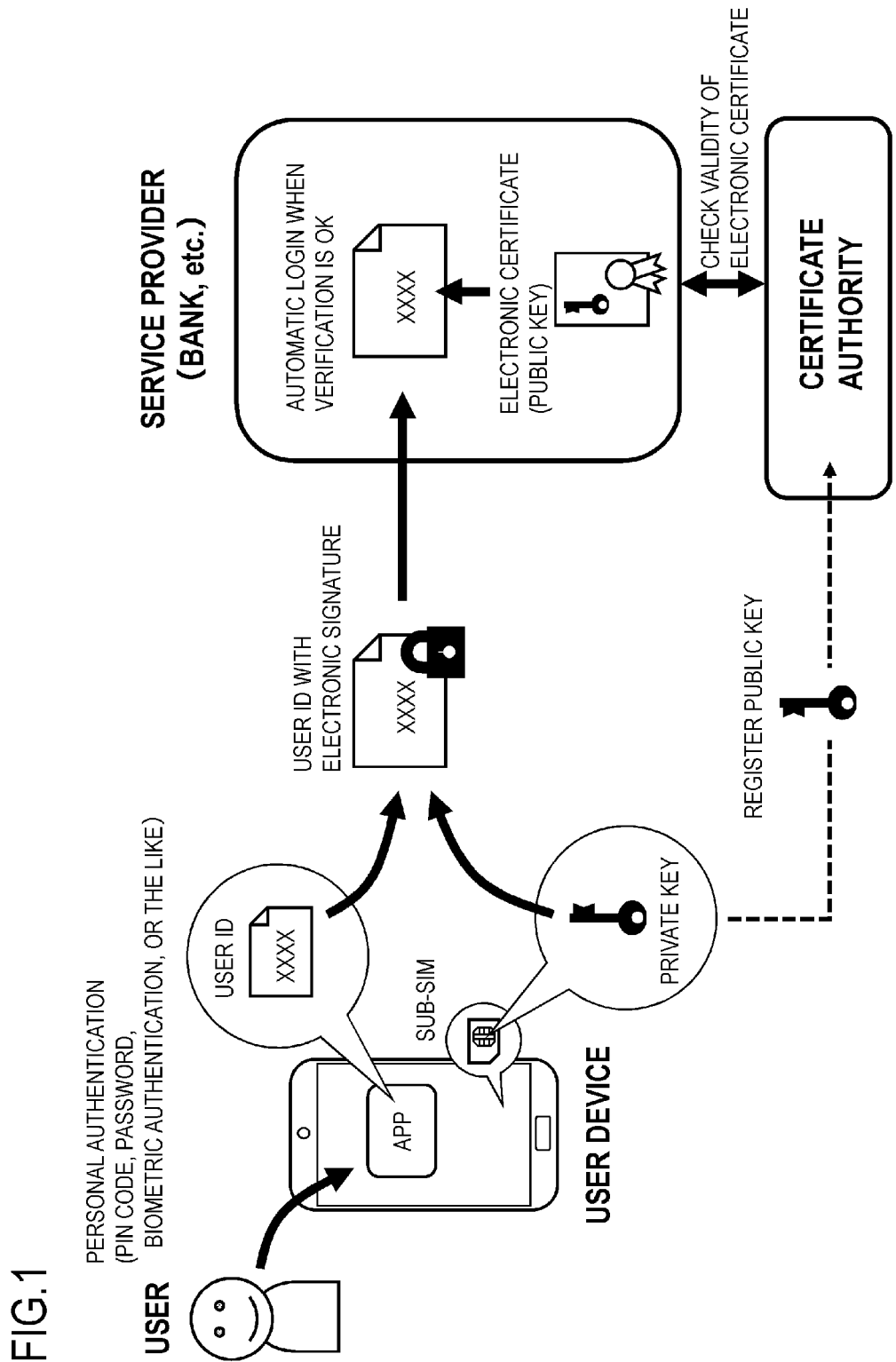
FIG. 1 is a diagram illustrating one characteristic of an online service providing system according to the present invention.

FIG. 1 illustrates a flow of automatic login authentication by public key encryption in which an IC card called a sub-SIM which is one of the characteristics of an online service providing system according to the present invention is used.

An application program for using an online service provided by a service provider such as a bank (hereinafter also referred to as an app) is installed on a user device (a smartphone or the like) possessed by a user and an IC card called a sub-SIM is inserted. The app stores a user ID which is a use account of the online service. A private key unique to the user is stored on the sub-SIM. When this service is carried out in Japan, it is assumed that a public key paired with the private key is registered in advance in a certificate authority accredited based on the act concerning electronic signatures and authentication work (Act No. 102 of 2000 (Heisei 12): hereinafter referred to as the "Electronic Signature Act") and an electronic certificate is issued by the certificate authority.

In the system, when a user activates an app, user authentication (personal authentication) by a PIN code, a password, biometric authentication, or the like is executed. When the user authentication is successful (that is, when it is confirmed that a party operating the app is the user), function limitation of the sub-SIM is released and a mode in which a function provided by the sub-SIM can be used is set. The app encrypts a user ID with a private key using the function of the sub-SIM and creates an electronic signature. When the electronic signature and the user ID are sent to a server of the online service, the server verifies the electronic signature using the corresponding electronic certificate. When the user ID is confirmed to be a user ID sent from a valid user, the user is permitted to use the online service (automatic login).

According to this method, it is not necessary to carry a device (such as a token of the related art) other than the user device and the online service can be used with the single user device, thereby realizing high convenience. Since automatic login can be executed through only activation of an app and personal authentication, smart and simple operability can be realized.

Further, since a private key stored on an IC card called a sub-SIM and an encryption function provided by the IC card are used, secure data communication can be realized. A private key has a small leakage risk and a private key or an encryption function cannot be used when personal authentication by a PIN code, a password, or biometric authentication is not cleared. Therefore, a risk of illegal use by a third party can be made as small as possible.

It is not necessary for a service provider to distribute or manage a device such as a token, and a reduction in administration cost can be expected. Since data with which an electronic signature appended using an electronic certificate issued by a certificate authority accredited based on the Electronic Signature Act is estimated to be created authentically by a user according to Article 3 of the Electronic Signature Act, there is the advantage that a risk of lawsuits can be reduced.

<Service Providing Server>

Figure 2:
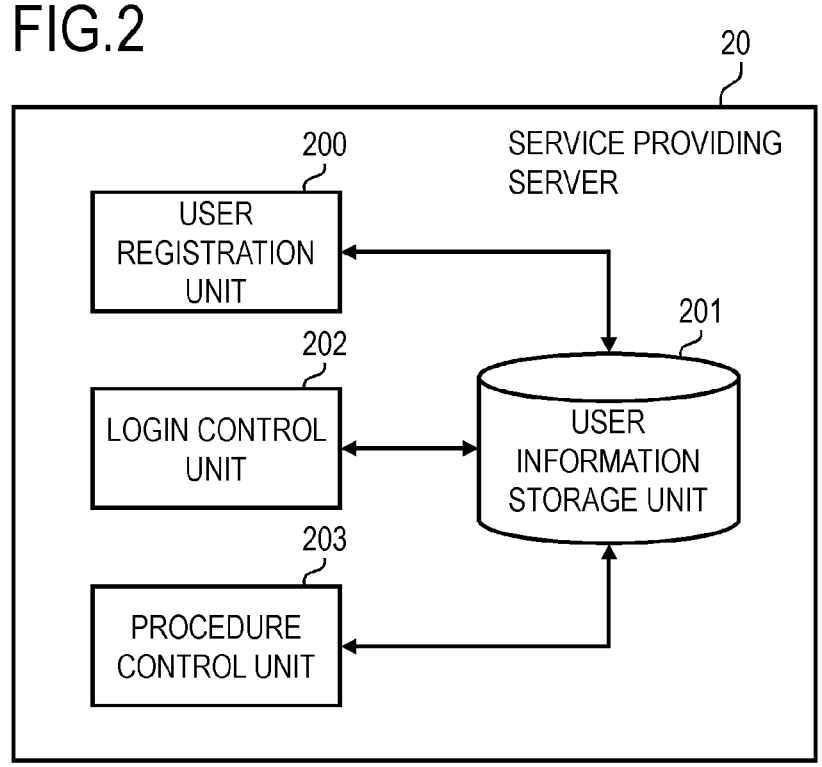
FIG. 2 is a block diagram illustrating a configuration of a service providing server providing an online service.

FIG. 2 is a block diagram illustrating a configuration of a service providing server. A service providing server 20 is a server that provides an online service of a service provider through the Internet. Hereinafter, the service providing server 20 will be described giving an example of an online financial transaction service (so-called online banking) of a financial institution such as a bank. However, this is merely one application example and the present invention can be preferably applied to all kinds of online services.

The service providing server 20 includes a user registration unit 200, a user information storage unit 201, a login control unit 202, and a procedure control unit 203 as main functions. The user registration unit 200 is a function of executing a new registration process for a user. The user information storage unit 201 is a database that stores and manages information regarding the registered users. The login control unit 202 is a function of controlling use or non-use of an online service in response to a login request from a user. The procedure control unit 203 is a function of controlling execution of a corresponding procedure of the online service in response to a procedure request from the user. The details of these functions and processes will be described below.

The service providing server 20 can be configured by, for example, a general-purpose computer that includes a CPU (a processor), a memory (a RAM), a storage (an HDD, an SSD, or the like), a communication I/F, and an input/output device. In this case, the above-described functions and processes are realized by loading a program stored in the storage on the memory and allowing the CPU to execute the program. The service providing server 20 may be configured by one computer, distributed computing, cloud computing, or the like. The service providing server 20 may be configured by a dedicated computer rather than a general-purpose computer or some of the above-described functions or processes may be configured by an ASIC, an FPGA, or the like rather than software.

<User Device>

Figure 3:
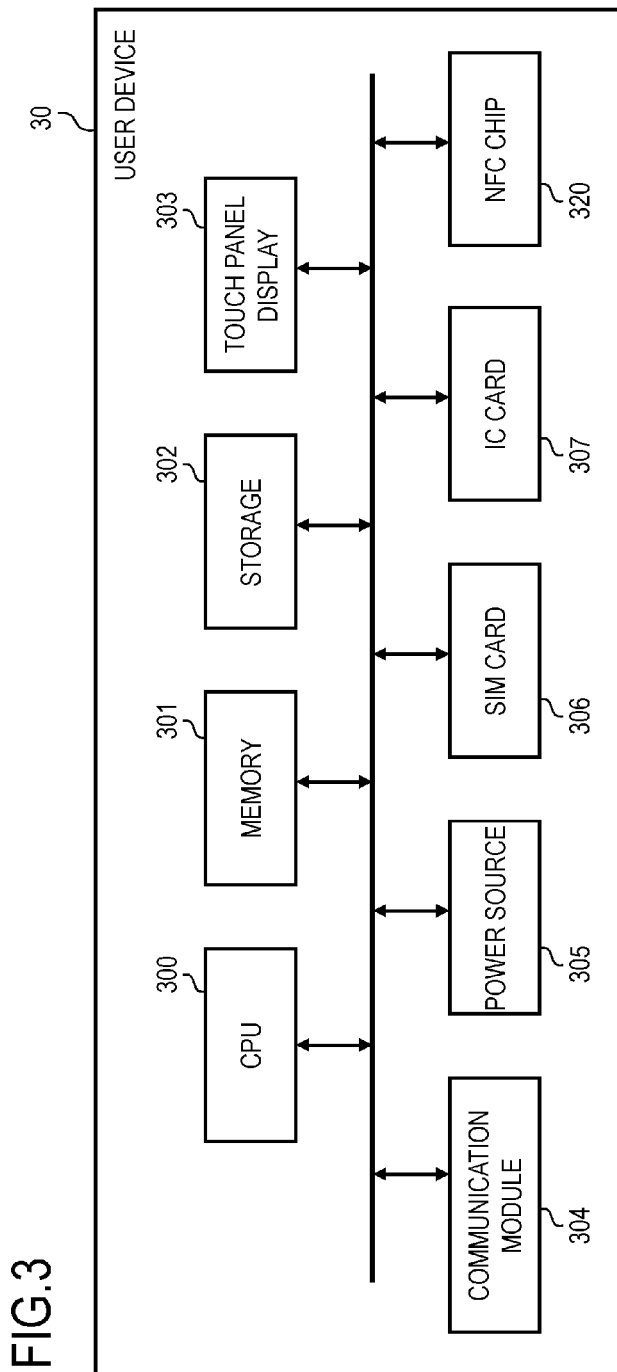
FIG. 3 is a block diagram illustrating a configuration of a user device used to use the online service.

FIG. 3 is a block diagram illustrating a configuration of a portable device used for a user to use an online service (hereinafter referred to as a "user device"). In the embodiment, a smartphone will be exemplified as an example of the user device 30. This is merely one application example. As the user device 30, any device may be used as long as the device is a portable electronic device which includes a processor and a memory to execute an application program for using the online service, into which a SIM card (Subscriber Identity Module Card) is inserted, and which can be connected to the Internet. Apart from a smartphone, for example, a tablet terminal, a mobile PC, a wearable PC, a smartwatch, smart glasses, a smart wallet, and a portable game device can be exemplified.

The user device 30 includes a CPU (a processor) 300, a memory 301, a storage 302, a touch panel display 303, a communication module 304, a power source 305, a SIM card 306, an IC card 307, and an NFC chip 320 as main hardware resources. The memory 301 is a RAM and provides a storage area used as a working memory by the CPU 300. The storage 302 is a nonvolatile storage medium that stores an application program or various kinds of data and corresponds to, for example, an embedded EEPROM or a flash memory inserted into a card slot. The touch panel display 303 is a device that serves as both a display device and an input device. The communication module 304 is a device that is in charge of data communication or voice communication by the user device 30. The communication module 304 according to the embodiment is assumed to support communication in which a mobile telephone network such as 3G or 4G/LTE, communication by Wi-Fi, near field communication, or the like is used. The power source 305 supplies power to the user device 30 and is configured as a lithium-ion battery and a power circuit. The SIM card 306 is a contact IC card on which subscriber information of communication using a mobile telephone network is recorded. The IC card 307 is a contact IC card as in the SIM card 306. The IC card 307 is a device additionally mounted on the user device 30 to realize secure use of an online service. The NFC chip 320 is an IC chip that provides a near field communication function in conformity with a NFC (Near Field Communication) standard and an application using the near field communication. In the embodiment, the SIM card 306, the IC card 307, and the NFC chip 320 are configured by different hardware, but an NFC function may be mounted on the SIM card 306 and/or the IC card 307.

<IC Card>

Figure 4:
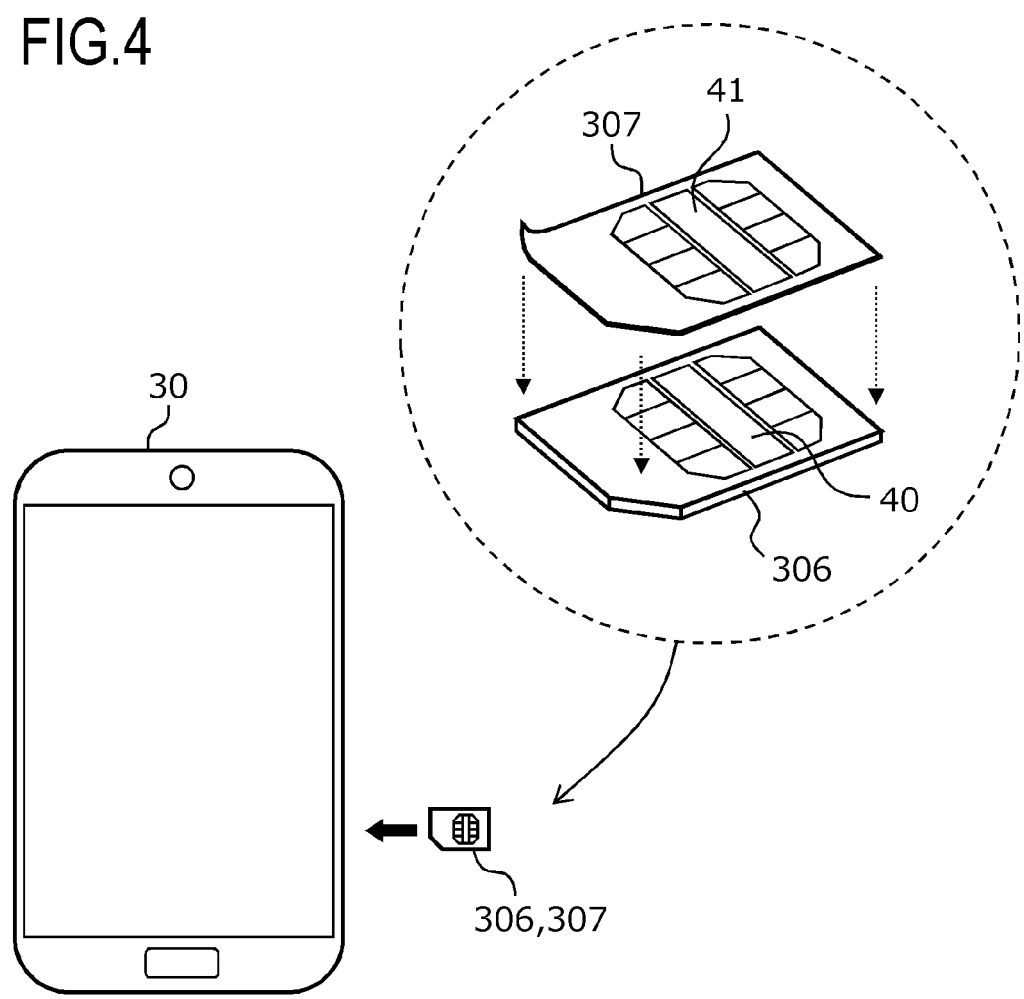
FIG. 4 is a diagram schematically illustrating appearances and insertion forms of a SIM card and an IC card.
Figure 5:
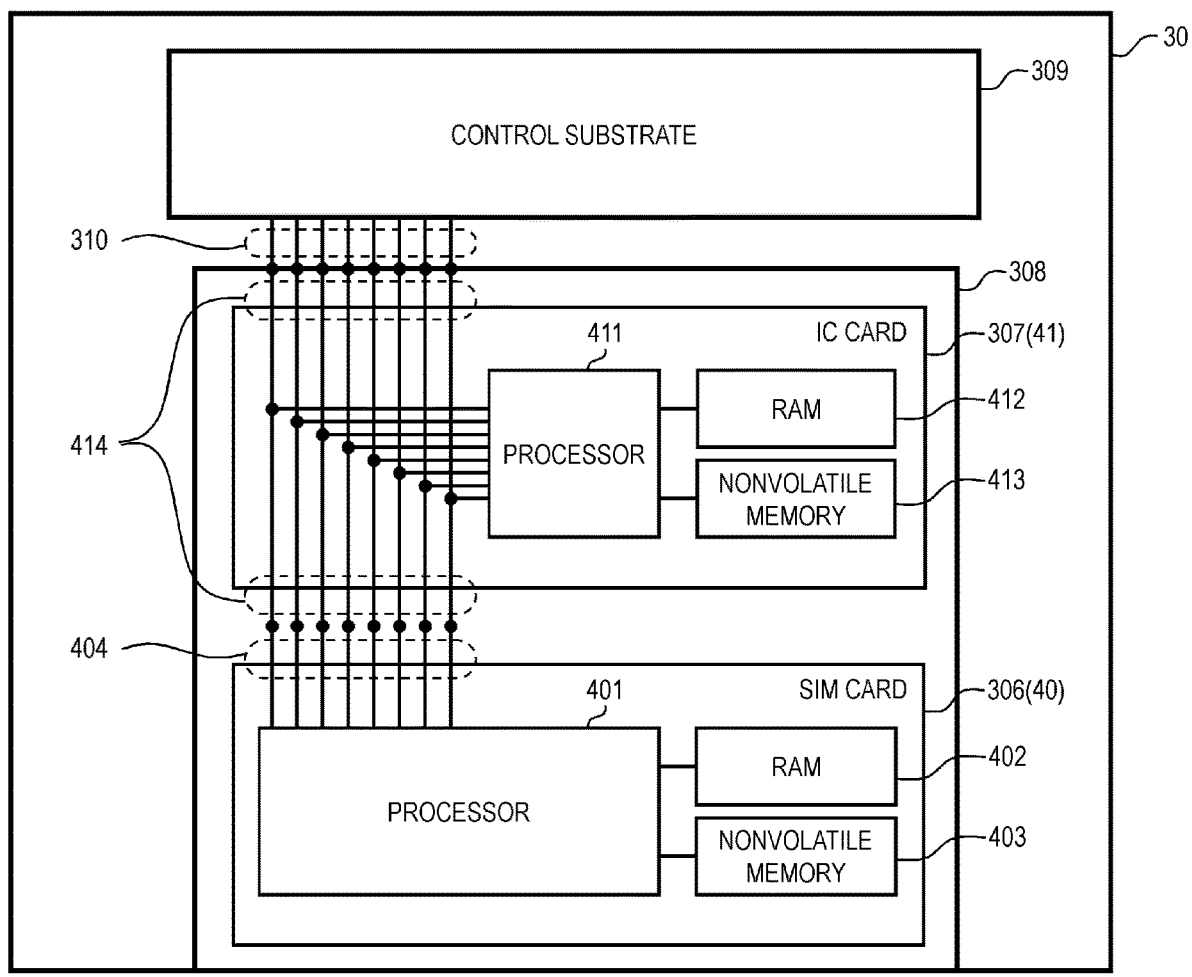
FIG. 5 is a block diagram schematically illustrating hardware configurations of the SIM card and the IC card.

FIG. 4 is a diagram schematically illustrating appearances and insertion forms of the SIM card 306 and the IC card 307. FIG. 5 is a block diagram schematically illustrating hardware configurations of the SIM card 306 and the IC card 307.

The SIM card 306 has a structure in which the IC chip 40 is mounted on a resin plate with a width of 15 mm×a height of 12 mm×a thickness of 0.76 mm. As illustrated in FIG. 5, the IC chip 40 includes a processor 401, a RAM 402, a nonvolatile memory 403, and eight pins (electrodes) 404. The nonvolatile memory 403 stores data such as a unique serial number (ICCID) of the SIM card 306 and subscriber identification information (IMSI) and a program executed by the processor 401. The eight pins 404 include a power input terminal, a reset terminal, a clock terminal, an earthing terminal, a program voltage input terminal, and I/O terminal, a reserve terminal.

When a user subscribes to a mobile communication service provided by a mobile network operator (MNO) or a mobile virtual network operator (MVNO), the SIM card 306 is provided from the service provider. The data or the program stored on the SIM card 306 differ for each service provider, but a basic structure of the SIM card 306 is identical as long as the SIM card 306 conforms to an international standard. In the embodiment, a micro-SIM will be exemplified, but a mini-SIM or a nano-SIM can also be used as the SIM card.

The IC card 307 has the same or substantially the same the width and the height as the SIM card 306 and has a structure in which an IC chip 41 is buried in a flexible film with a thickness of about 0.1 to 0.2 mm. The IC chip 41 also includes a processor 411, a RAM 412, a nonvolatile memory 413, and eight pins (electrodes) 414. The nonvolatile memory 413 of the IC card 307 stores data and a program for realizing secure use of the online service (the details of which will be described below).

The eight pins 414 of the IC card 307 are exposed on both the front surface and rear surface of the IC card 307 and have the same arrangement as the eight pins 404 of the SIM card 306. As illustrated in FIG. 4, corresponding pins (electrodes) of the IC card 307 and the SIM card 306 are connected physically and electrically by stacking with and attaching the IC card 307 and the SIM card 306. Since the IC card 307 is very thin, the SIM card 306 to which the IC card 307 is attached can be inserted into the SIM card slot 308 of the user device 30. FIG. 5 schematically illustrates a state in which the IC card 307 and the SIM card 306 are inserted into the SIM card slot 308. The pins 414 on the front surface of the IC card 307 are connected to the terminal 310 of the control substrate 309 of the user device 30 and the pins 404 of the SIM card 306 are connected to the terminal 310 of the control substrate 309 via the pins 414 of the IC card 307.

The CPU 300 of the user device 30 can selectively access any of the IC card 307 and the SIM card 306. In other words, an application program operated by the CPU 300 of the user device 30 can selectively switch between a mode in which communication is executed by the IC card 307 and a mode in which communication is executed by the SIM card 306. In the case of the former mode, the processor 411 of the IC card 307 processes a signal (a command) that it has received from the user device 30 and the signal is not transmitted to the SIM card 306. On the other hand, in the case of the latter mode, the processor 411 of the IC card 307 executes an operation of relaying (passing) a signal between the user device 30 and the SIM card 306. In the embodiment, the type of IC card 307 stacked with and attached to the communication SIM card 306 is also referred to as a "sub-SIM".

When the sub-SIM type of IC card 307 is used, the following advantages can be obtained. The IC card 307 can be inserted into a portable device that has a SIM card slot (that is, for a portable device, a special structure or handiwork is not necessary at all and the IC card 307 can be inserted into almost any portable device). The IC card 307 can be inserted into a portable device that has only one SIM card slot (in other words, a portable device in which there is no empty SIM card slot). The communication SIM card 306 and the IC card 307 are completely independent functionally and have no effect on each other. Therefore, after the IC card 307 is inserted, voice communication or data communication can be used together similarly. Further, since a SIM card of any service provider can be added, introduction and supply are easy.

<Function of IC Card>

Figure 6:
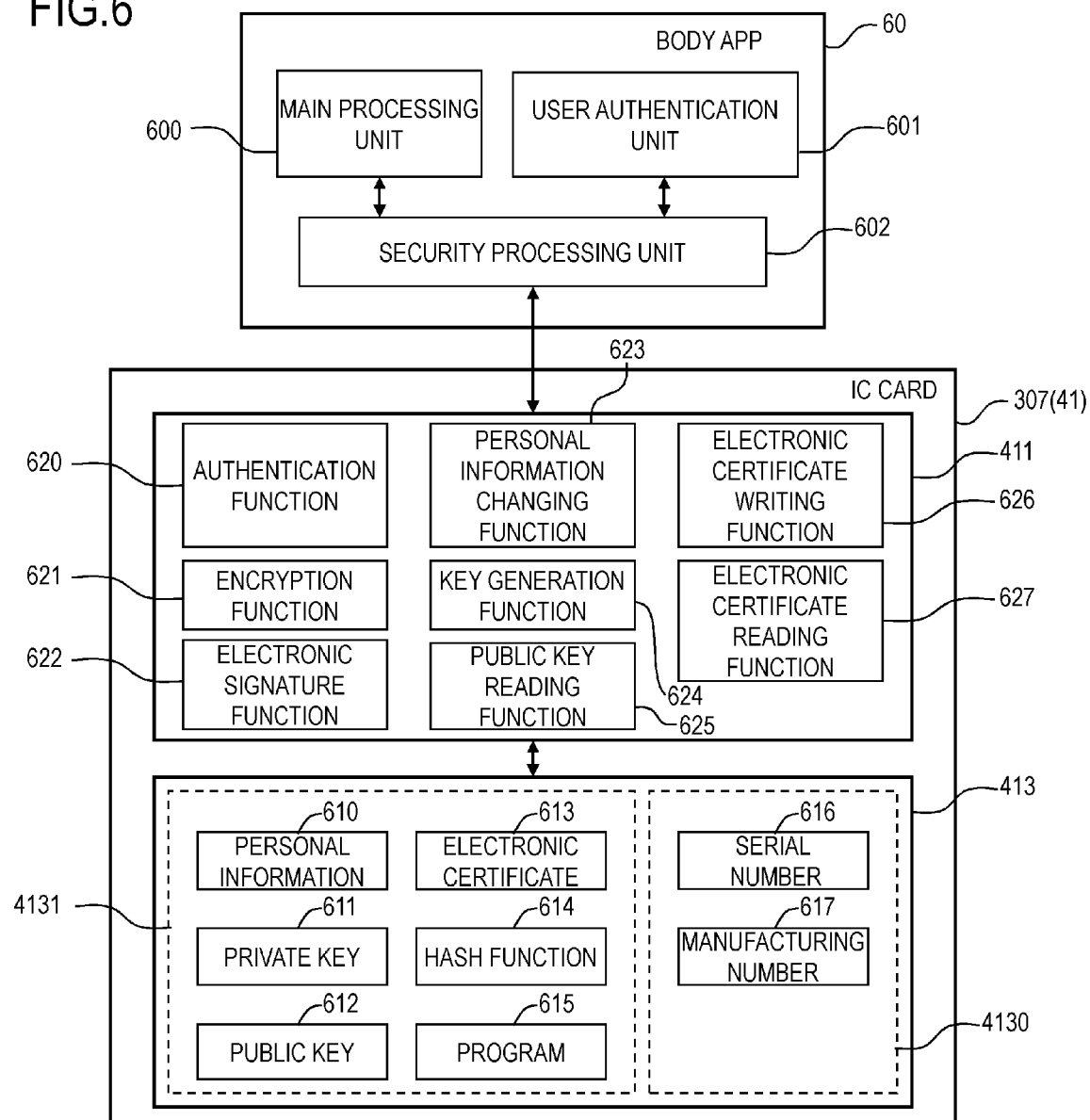
FIG. 6 is a block diagram schematically illustrating logical configurations of a user device and the IC card.

FIG. 6 is a block diagram schematically illustrating logical configurations of the user device 30 and the IC card 307.

In the user device 30, an application program 60 for using an online service provided by the service providing server 20 (hereinafter simply referred to as a "body app 60") is installed. The body app 60 is a program that is distributed by a service provider of the online service (a bank or the like in the case of this embodiment). A user downloads and installs the body app 60 through an application distributer on the Internet before using the online service.

The body app 60 includes a main processing unit 600, a user authentication unit 601, and a security processing unit 602 as main functions. The main processing unit 600 is a function in charge of controlling display or input of a use screen of the online service and transmitting and receiving data to and from the service providing server 20. The user authentication unit 601 is a function in charge of a process of checking validity of a party using the user device 30. Here, the user authentication is executed to check whether a party actually operating the user device 30 is a valid party (a user or a party who has received permission from a valid user). The security processing unit 602 is a function of executing security processing such as encryption or an electronic signature of data using the function of the IC card 307.

The nonvolatile memory 413 (hereinafter simply referred to as a "memory 413") of the IC card 307 stores personal information 610 used for the above-described user authentication, a pair of a private key 611 and a public key 612 of the user, an electronic certificate 613 of the user, a hash function 614, and a program 615. An address space of the memory 413 has an area 4130 that can be accessed (reading and writing) from the outside and an area that cannot be accessed from the outside (that is, an area accessible to only the processor 411 of the IC card 307) 4131. The data used in the security processing (the personal information 610, the private key 611, the public key 612, the electronic certificate 613, the hash function 614, the program 615, and the like) is all stored in the area 4131 and cannot be read and written directly from the outside (for example, the body app 60 or the like). Data such as a serial number 616 and a manufacturing number 617 of the IC card 307 is stored in the area 4130 and can be read from the outside.

The processor 411 of the IC card 307 provides several APIs (Application Programming Interfaces) related to the security function to external apps. FIG. 6 illustrates, for example, an authentication function 620, an encryption function 621, an electronic signature function 622, a personal information changing function 623, a key generation function 624, a public key reading function 625, an electronic certificate writing function 626, and an electronic certificate reading function 627. These functions are realized by the processor 411 executing the program 615.

The authentication function 620 is a function of executing user authentication by collating information given from the outside with the personal information 610 stored in the memory 413. The functions 621 to 627 other than the authentication function 620 cannot be used when the user authentication is not successful. Any method for the user authentication can be used. For example, when the authentication method is PIN code authentication, the authentication function 620 receives a code (for example, a number of 4 digits) input by the user from the user authentication unit 601 of the body app 60 and checks whether the input code matches the PIN code registered as the personal information 610. When the input code matches the PIN code, a result of "OK" is returned. When the input code does not match the PIN code, a result of "NG" is returned. When the authentication method is password authentication, the authentication function 620 receives a password (for example, a password of 6 to 16 characters) input by the user from the user authentication unit 601 of the body app 60 and checks whether the input password matches a password registered as the personal information 610. When the input password matches the password registered as the personal information 610, the result of "OK" is returned. When the input password does not match the password registered as the personal information 610, the result of "NG" is returned. When the authentication method is biometric authentication, the authentication function 620 receives biometric information (a facial image, a voiceprint, an iris, a fingerprint, a vein, or the like) of the user from the user authentication unit 601 of the body app 60 and determines whether the biometric information is the user's own biometric information by comparing characteristics extracted from the biometric information with a personal feature registered as the personal information 610. When the biometric information is determined to be the user's own biometric information, the result of "OK" is returned. When the biometric information is determined not to be the user's own biometric information, the result of "NG" is returned. More advanced security may be realized by combining two or more of the PIN code authentication, the password authentication, and the biometric authentication or combining another authentication method.

The encryption function 621 is a function of encrypting data given from the outside using the private key 611. For example, the encryption function 621 receives the data from the security processing unit 602 of the body app 60, encrypts the data using the private key 611, and returns the encrypted data (a cryptogram). An encryption algorithm is preferably RSA, DSA, ECDSA, or the like and any algorithm may be used.

The electronic signature function 622 is a function of executing an electronic signature on data given from the outside using the private key 611. A difference from the encryption function 621 is that the given data is not encrypted, but a hash value of the given data is encrypted. For example, the electronic signature function 622 receives data from the security processing unit 602 of the body app 60, calculates a hash value by the hash function 614, encrypts the hash value using the private key 611, and returns the encrypted hash value. Any hash function may be used (SHA-1 and SHA-256 are used in this embodiment). When the size of electronic signature target data is small, a signature obtained by encrypting the data may be used as an electronic signature rather than the hash value.

The personal information changing function 623 is a function of writing the personal information 610 on the memory 413 or updating or deleting the personal information 610 stored in the memory 413. This function is used when the body app 60 newly registers or changes information regarding the user on the IC card 307.

The key generation function 624 is a function of generating a pair of the private key 611 and the public key 612. In an initial state of the IC card 307, information associated with the user, such as the personal information 610, the private key 611, the public key 612, and the electronic certificate 613, is not stored in the memory 413 and is registered in the memory 413 at the time of a procedure of issuing the IC card (this operation is referred to as activation of the IC card) as will be described below. By executing the generation of the private key 611 and the storing in the memory 413 in a closed space of the IC card 307, it is possible to reduce a leakage risk of the private key 611. In the embodiment, since an API reading the private key 611 from the memory 413 is not prepared, the leakage risk of the private key 611 to the outside is almost zero.

The public key reading function 625 is a function of reading the public key 612 from the memory 413. The electronic certificate writing function 626 is a function of writing the electronic certificate 613 on the memory 413 and the electronic certificate reading function 627 is a function of reading the electronic certificate 613 from the memory 413. Since the public key 612 or the electronic certificate 613 is distributed to a communication partner, the public key 612 or the electronic certificate 613 can be read to the outside. Writing the electronic certificate 613 is necessary at the time of the procedure of issuing the IC card.

In the above-described configuration, the body app 60 of the user device 30 can realize the encryption of the data or the electronic signature simply through the public key encryption by using the IC card 307. When the function of the encryption or the electronic signature of the IC card 307 is used, user authentication is necessary. Further, since the leakage risk of the private key is almost zero, considerably robust security is guaranteed.

<Procedure of Issuing IC Card>

Figure 7:
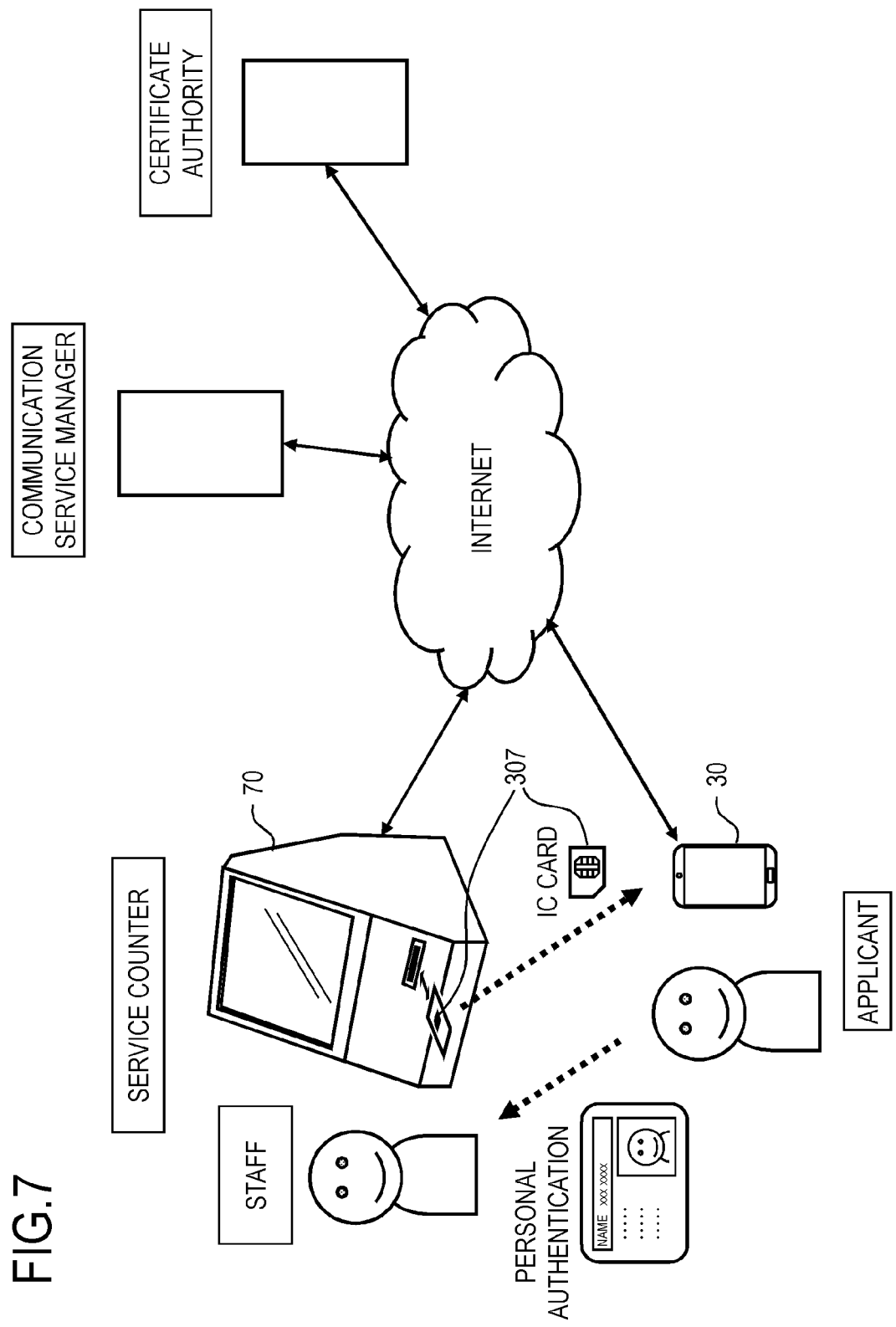
FIG. 7 is a diagram illustrating a procedure of issuing an IC card.
Figure 8:
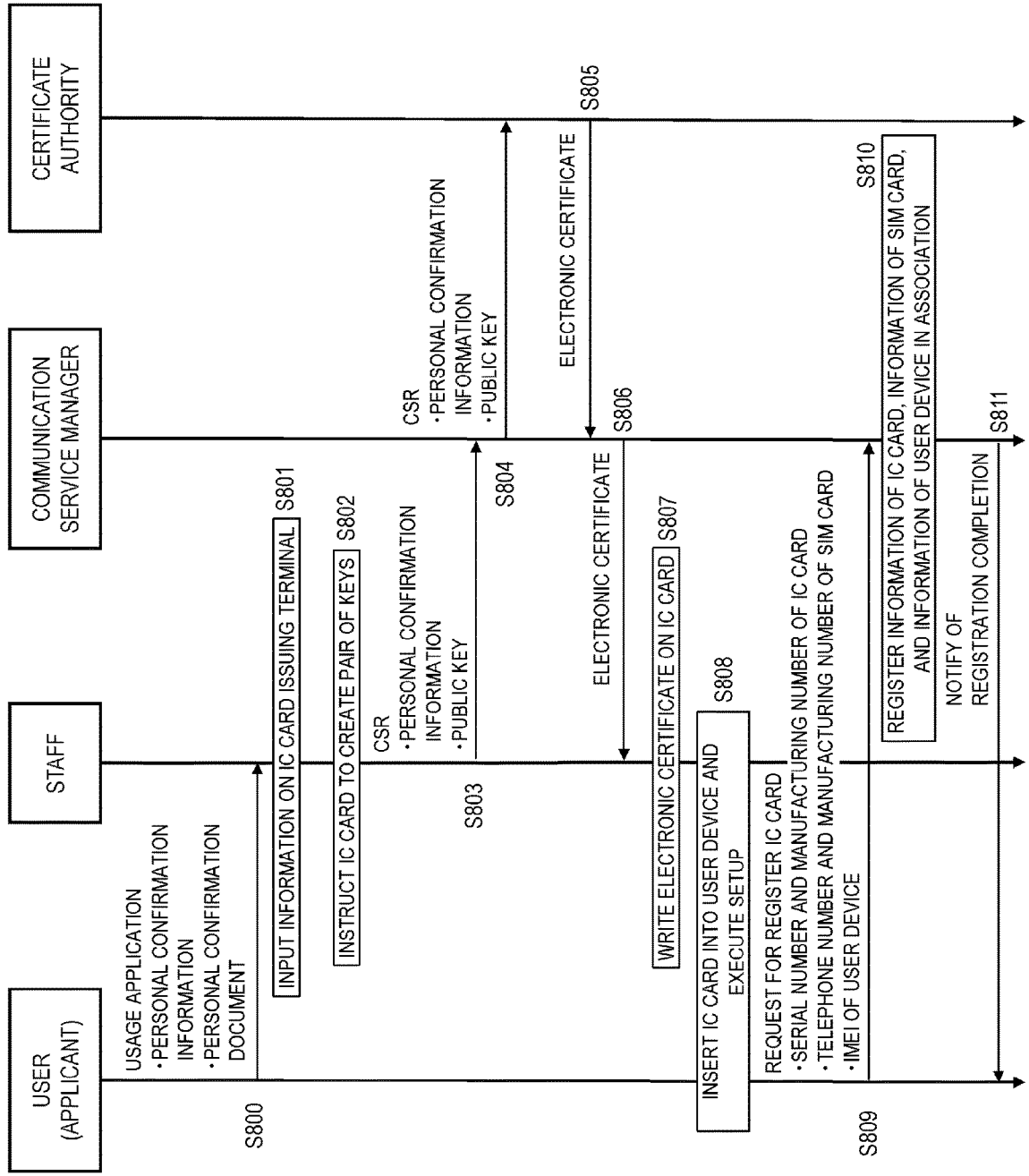
FIG. 8 is a diagram illustrating a procedure of issuing the IC card.

A procedure of issuing the IC card 307 (activation of the IC card) will be described with reference to FIGS. 7 and 8. FIG. 7 is a diagram illustrating an IC card issuing terminal and FIG. 8 is a diagram illustrating a flow of a procedure of issuing the IC card.

The IC card issuing terminal 70 is a terminal that newly issues the IC card 307 and is installed in, for example, a mobile phone shop, a service provider store (a bank or the like), a convenience store, a service counter of an agency, or the like. The IC card issuing terminal 70 is configured by a computer that includes a reader/writer of an IC card. When operated by a store staff member, the IC card issuing terminal 70 may be configured by a general-purpose personal computer or a tablet terminal. When operated a user (an applicant for an IC card), the IC card issuing terminal 70 may be configured as a KIOSK terminal.

A flow of an issuing procedure will be described with reference to FIG. 8. Here, the "user" is a party that newly applies for the IC card 307 to use the online service (referred to as a "user" or an "applicant" in description of FIG. 8). The "staff" is a party that executes issue work of the IC card 307 using the IC card issuing terminal 70. A "communication service manager" is a party in charge of managing issuance or administration of the IC card 307. The communication service manager is, for example, in charge of providing the IC card 307, applying an electronic certificate to a certificate authority, managing the issued IC card, managing association of the IC card 307 and the SIM card 306, and invalidating the IC card 307 (for example, when the user device 30 is lost, stolen, or discarded). Since the security function of the IC card 307 can be used for various online services, the communication service manager may work in a different business company from the service provider of the online service. The "certificate authority" is a party that issues or annuls an electronic certificate of a public key.

The applicant for an IC card first makes a use application of the IC card in a service counter (step S800). In the use application, personal confirmation information of the applicant is delivered and a personal confirmation document (a driver's license or the like) is presented. The personal confirmation information may include, for example, a name, a sex, a date of birth, and an address. The applicant designates a PIN code to be registered on the IC card. A staff executes personal confirmation by collating the information delivered from the applicant with the personal confirmation document, and then inputs the information on the IC card issuing terminal 70 (step S801). The applicant may be allowed to input the PIN code so that the PIN code is not known to the staff.

Subsequently, the staff sets the new IC card 307 on the IC card issuing terminal 70 and gives an instruction to start an activation process. On the memory 413 of the IC card 307 in this stage, only "the hash function 614 and the program 615" are stored among the information illustrated in FIG. 6. The "private key 611, the public key 612, and the electronic certificate 613" which are information associated with the user have not been stored, and the PIN code of the personal information 610 is an initial value (for example, "0000"). The IC card issuing terminal 70 first executes authentication with the PIN code of the initial value using the authentication function 620, and subsequently registers the PIN code designated by the applicant using the personal information changing function 623 and instructs the key generation function 624 to create a pair of keys to create the private key 611 and the public key 612 (step S802). The PIN code and the pair of keys are written in a predetermined area 4131 of the memory 413. Subsequently, the IC card issuing terminal 70 reads the public key 612 from the memory 413 using the public key reading function 625, creates a CSR (Certificate Signing Request) from the public key 612 and the personal confirmation information input in step S801, and transmits the CSR to a management server of the communication service manager (step S803).

The management server transmits the CSR to a predetermined certificate authority when the CSR is received from the IC card issuing terminal 70 (step S804). At this time, the management server may execute a credit check of the applicant based on the personal confirmation information.

The certificate authority issues the electronic certificate of the public key of the applicant in accordance with the received CSR and transmits the electronic certificate to the management server (step S805). The electronic certificate is a certificate used to prove the public key and the owner of the electronic certificate. In the case of X.509 designed by ITU-T, the electronic certificate is data that includes the public key, owner information (which corresponds to personal confirmation information), an electronic signature of the certificate authority, a validity period of the electronic certificate, and information of an issuer. The electronic signature of the certificate authority is an electronic signature obtained by encrypting a hash value created from the owner information and the public key included in the electronic certificate with the private key of the certificate authority.

The management server transmits the issued electronic certificate to the IC card issuing terminal 70 (step S806). The IC card issuing terminal 70 writes the electronic certificate on the memory 413 using the electronic certificate writing function 626 of the IC card 307 (step S807). In this state, on the memory 413 of the IC card 307, the personal information 610 (the PIN code in this embodiment), the private key 611, the public key 612, and the electronic certificate 613 which are data necessary for security processing are arranged.

Subsequently, the IC card 307 is inserted into the user device 30 of the applicant (step S808). Specifically, the communication SIM card 306 is extracted from the user device 30, the IC card 307 is attached to the SIM card 306, and subsequently the SIM card 306 is inserted into the user device 30 again. Further, a setup program is installed on the user device 30 and a setup process for the IC card 307 is executed by the setup program. The insertion and the setup of the IC card 307 may be executed by the staff or the applicant.

In the setup process, the user device 30 (the setup program operated by the user device 30) reads a "serial number" and a "manufacturing number" from the IC card 307 and reads a "telephone number" and a "manufacturing number" from the SIM card 306. The setup program acquires an IMEI (International Mobile Equipment Identity) as information regarding the user device 30. The setup program transmits a request for registering the IC card to the management server of the communication service manager together with the information (step S809). When the management server receives the request for registering the IC card from the user device 30, the management server registers information regarding the IC card 307, the SIM card 306, and the user device 30 included in the request in an IC card management database (step S810).

FIG. 9 illustrates an example of a data structure of IC card management information stored in the IC card management database. The "telephone number" and the "manufacturing number" of the SIM card 306 and the "IMEI" of the user device 30 are managed in association with the "serial number" and the "manufacturing number" of the IC card 307. Although not illustrated, personal confirmation information (a name, a sex, an address, a date of birth) of the user, the public key, information of the electronic certificate, and the like may be managed as the IC card management information.

When the registration of the IC card management information is completed, the management server notifies the user device 30 of registration completion (step S811). Thus, the setup of the user device 30 is completed and the IC card 307 enters a usable state (an activation state).

The issuing procedure illustrated in FIG. 8 is merely an example and the issuing procedure may be executed in a different procedure. For example, the IC card 307 in which the private key, the public key, the electronic certificate, and the PIN code are registered in advance may be prepared in the service counter. In this case, since a writing process on the IC card 307 is not necessary, it is not necessary to use the IC card issuing terminal 70. The procedure of issuing the IC card can become simple through the setup process on the user device 30. When the biometric authentication is used rather than the PIN code authentication, biometric information (a facial image, a voiceprint, an iris, a fingerprint, or the like) registered as the personal information on the IC card 307 may be input using the IC card issuing terminal 70 or the like.

<First Registration for Online Service>

Figure 10:
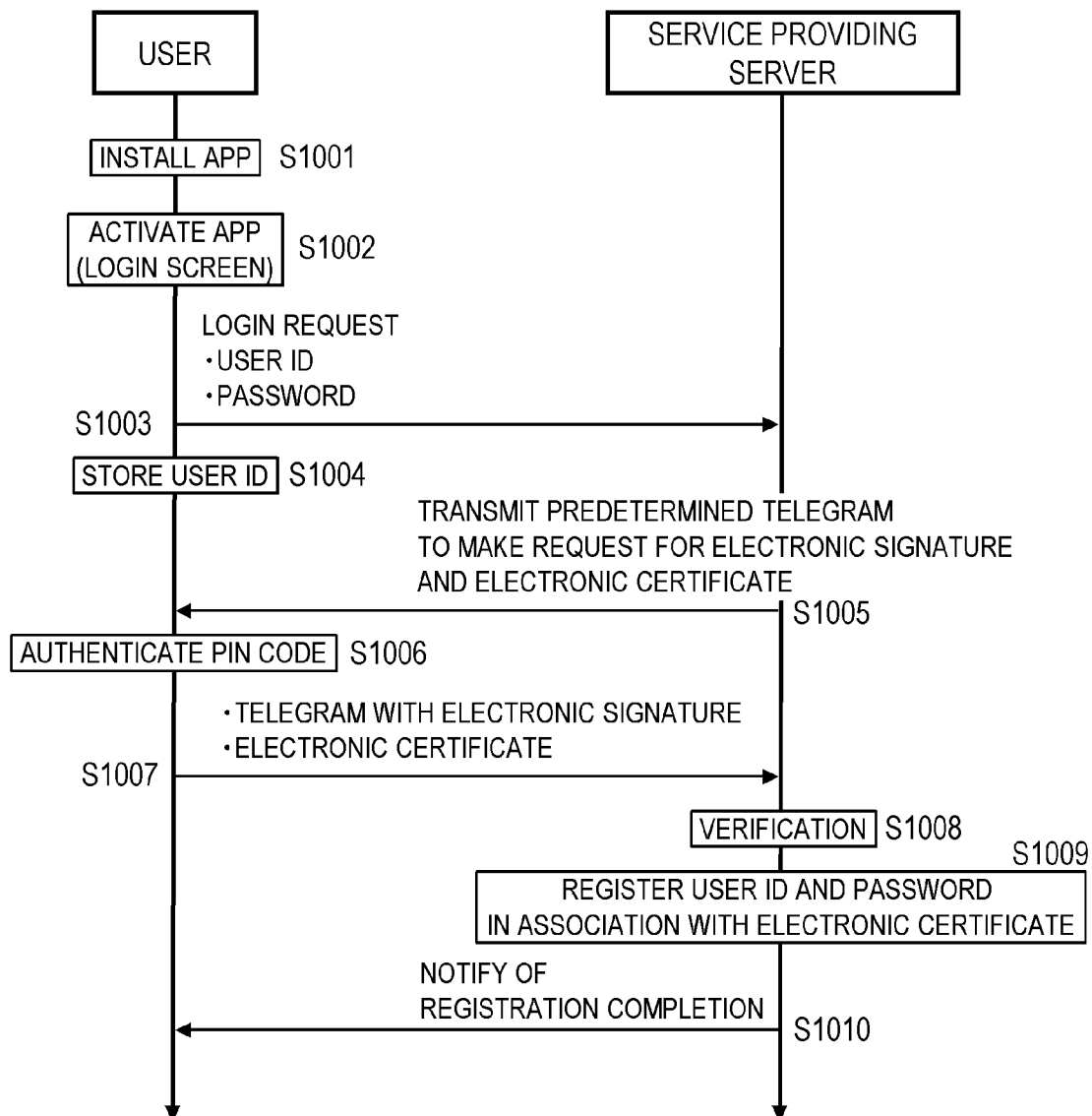
FIG. 10 is a diagram illustrating a flow of a procedure of executing registration for an online service.

A first registration procedure for an online service will be described with reference to FIGS. 10 and 11. FIG. 10 is a diagram illustrating a flow of a registration procedure for the online service and FIG. 11 is a diagram illustrating an example of a screen displayed on the user device 30.

First, the user operates the user device 30 to download and install the body app 60 (step S1001). Then, the user activates the body app 60 to open a login screen of the online service (step S1002). As illustrated in FIG. 11, at the time of first login, the user inputs the user ID and the password on the login screen 110 to log in to the online service (step S1003). At this time, the body app 60 stores the user ID in a nonvolatile memory (step S1004). The password may not be stored on the user device 30 from the viewpoint of security. The user ID and the password are information assigned by the service provider when a new use application of the online service which is a separate procedure is made.

When the login is completed, the service providing server 20 transmits a predetermined telegram (which may have any content) to the user device 30 to make a request for an electronic signature and an electronic certificate (step S1005).

Figure 11:
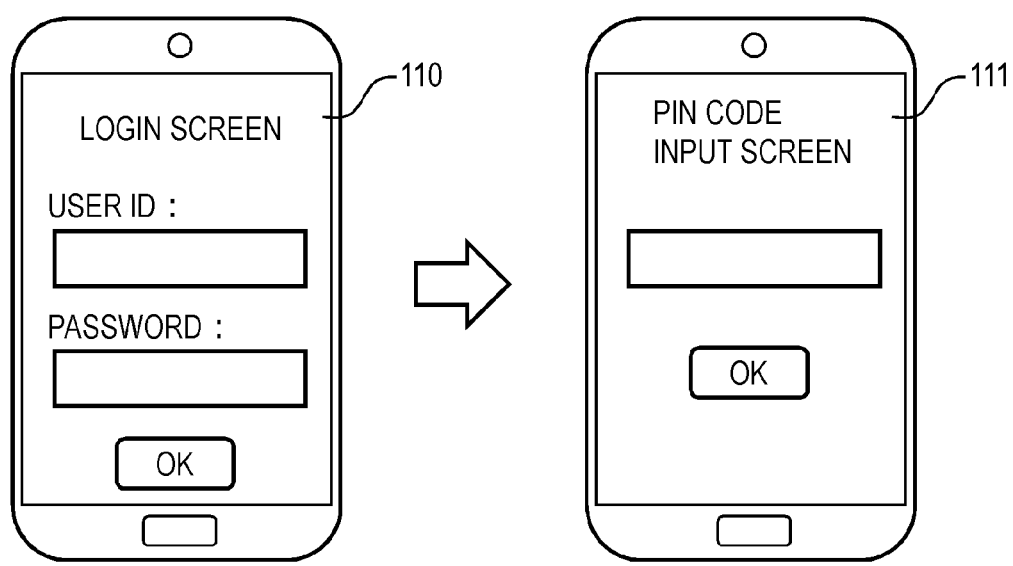
FIG. 11 is a diagram illustrating a screen example displayed on a user device in the procedure of executing registration for an online service.

The user authentication unit 601 of the body app 60 displays a PIN code input screen 111, as illustrated in FIG. 11. When the user inputs a PIN code, the user authentication unit 601 checks whether the input PIN code is correct using the authentication function 620 of the IC card 307 (step S1006). When the PIN code is correct (that is, the user authentication is successful), the other functions 621 to 627 of the IC card 307 can be used from the body app 60. The security processing unit 602 of the body app 60 executes an electronic signature in the telegram received from the service providing server 20 using the electronic signature function 622 of the IC card 307 and reads the electronic certificate 613 from the memory 413 using the electronic certificate reading function 627. Then, the main processing unit 600 of the body app 60 transmits the telegram with the electronic signature and the electronic certificate 613 to the service providing server 20 (step S1007).

The service providing server 20 verifies the telegram with the electronic signature using the electronic certificate 613 received from the user device 30 (step S1008). The "verification" is an operation of checking whether the user executes the electronic signature (that is, the user creates the electronic signature with the private key) by decoding the telegram with the electronic signature with the public key included in the electronic certificate 613 and investigating agreement of a decoded result and the original telegram. When the electronic signature is data obtained by encrypting the telegram, the decoded result and the original telegram may be compared. When the electronic signature is data obtained by encrypting a hash value of the telegram, the decoded result and the hash value of the original telegram may be compared.

When the verification is successful, the service providing server 20 registers the password and the user ID of the user in the user information storage unit 201 in association with the electronic certificate (step S1009). Then, the service providing server 20 notifies the body app 60 that the registration of the electronic certificate is completed (step S1010). After the association of the user ID and the electronic certificate is completed, the login can be executed through a simpler operation, as will be described below.

<Login in Online Service>

Figure 12:
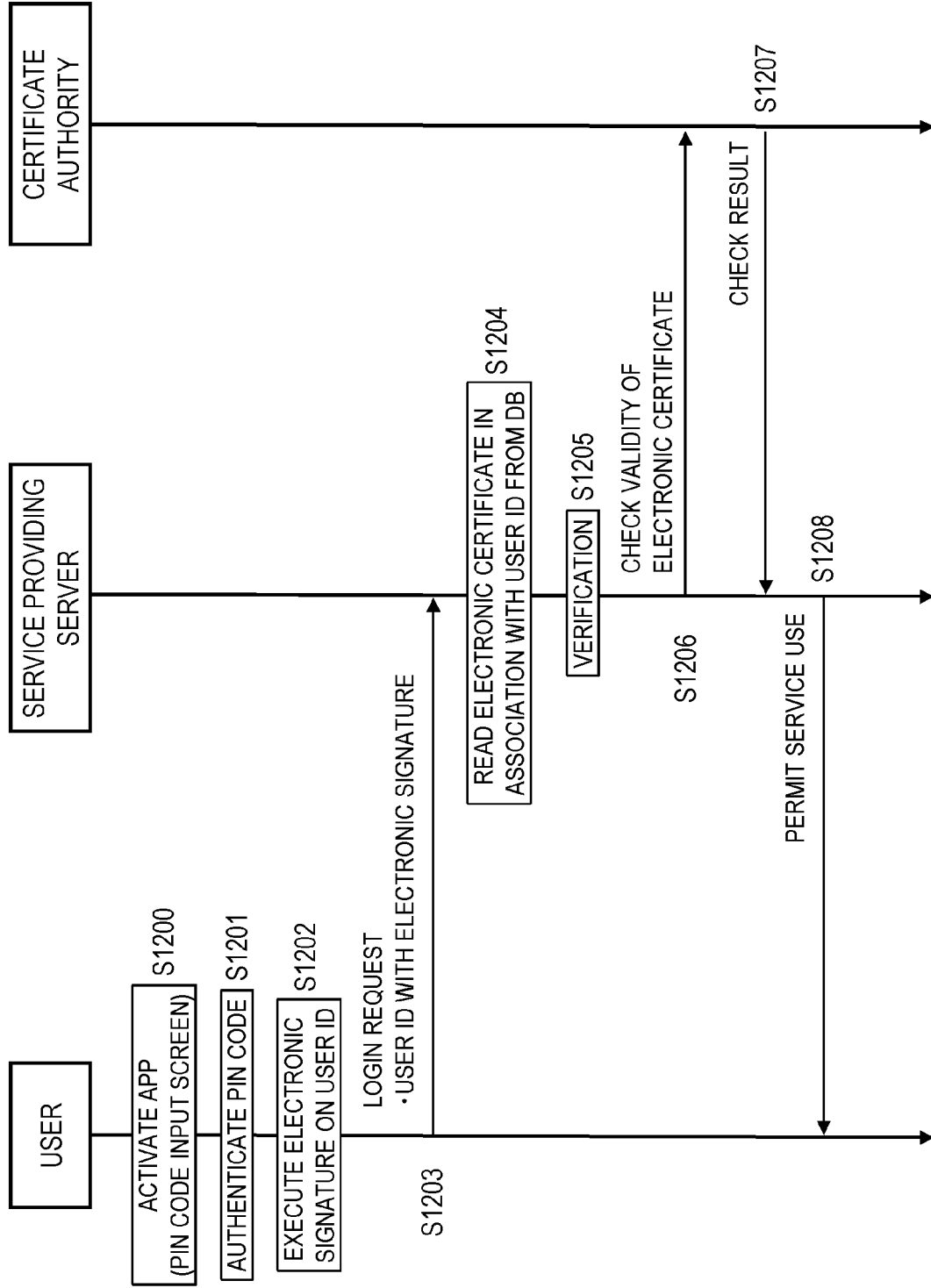
FIG. 12 is a diagram illustrating a flow of login authentication of the online service.

Login authentication of the online service will be described with reference to FIGS. 12 and 13. FIG. 12 is a diagram illustrating a flow of the login authentication of the online service and FIG. 13 is a diagram illustrating an example of a screen displayed on the user device 30.

Figure 13:
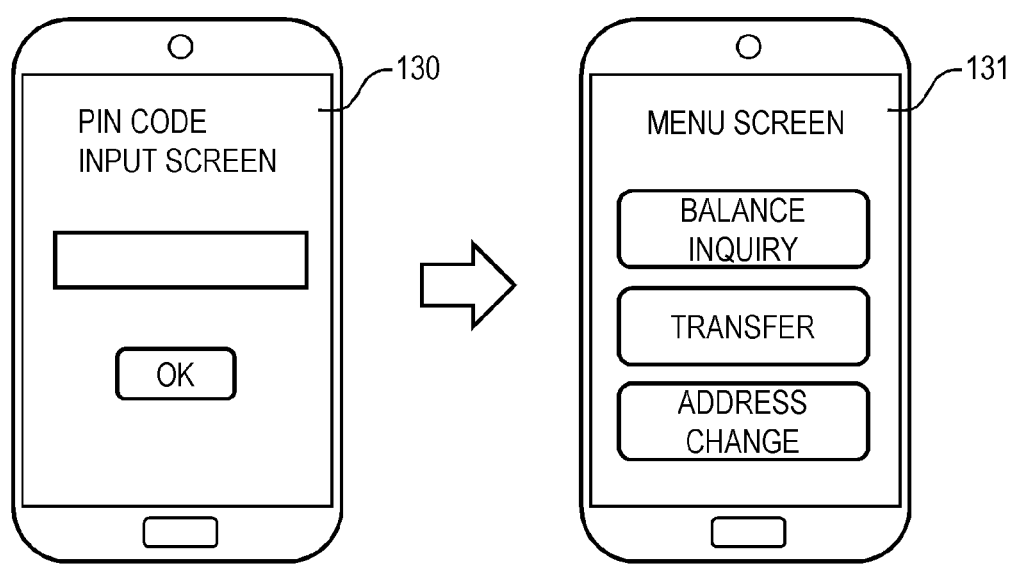
FIG. 13 is a diagram illustrating a screen example displayed on a user device in the login authentication of the online service.

When the user activates the body app 60 in the user device 30, the user authentication unit 601 displays a PIN code input screen 130, as illustrated in FIG. 13 (step S1200). When the user inputs the PIN code, the user authentication unit 601 checks whether the input PIN code is correct using the authentication function 620 of the IC card 307 (step S1201). When the PIN code is correct (that is, the user authentication is successful), the security processing unit 602 of the body app 60 executes the electronic signature for the user ID of the online service using the electronic signature function 622 of the IC card 307 (step S1202). Since the data size of the user ID is a size from about several bytes to tens of bytes, an electronic signature obtained by encrypting the user ID with the private key 611 may be used as the electronic signature. Then, the main processing unit 600 of the body app 60 transmits a login request to the service providing server 20 (step S1203). The user ID with the electronic signature (that is, the electronic signature of the user ID and the user ID of the plane text) are added to the login request.

When the login request is received, the login control unit 202 of the service providing server 20 reads the corresponding electronic certificate from the user information storage unit 201 based on the user ID included in the login request (step S1204). Then, the login control unit 202 verifies the user ID with the electronic signature included in the login request using the electronic certificate (step S1205). The login control unit 202 may inquire of the certificate authority about validity of the electronic certificate as necessary (steps S1206 and S1207). When the user ID with the electronic signature is verified successfully and the validity of the electronic certificate is confirmed, the login control unit 202 determines that the login request is a request from the valid user and permits use of the online service from the user device 30 (step S1208). Hereinafter, as illustrated in FIG. 13, a menu screen 131 of the online service is displayed on the user device 30 and the user can execute a desired procedure.

According to the above-described login authentication, when the user merely inputs a PIN code, login to the online service can be executed with a very simple operation, compared to a method of inputting an ID and a password every time in the related art or a method of using a token. Further, since the security function provided by the IC card 307 is used, advanced security is guaranteed.

<Use of Online Service>

Figure 14:
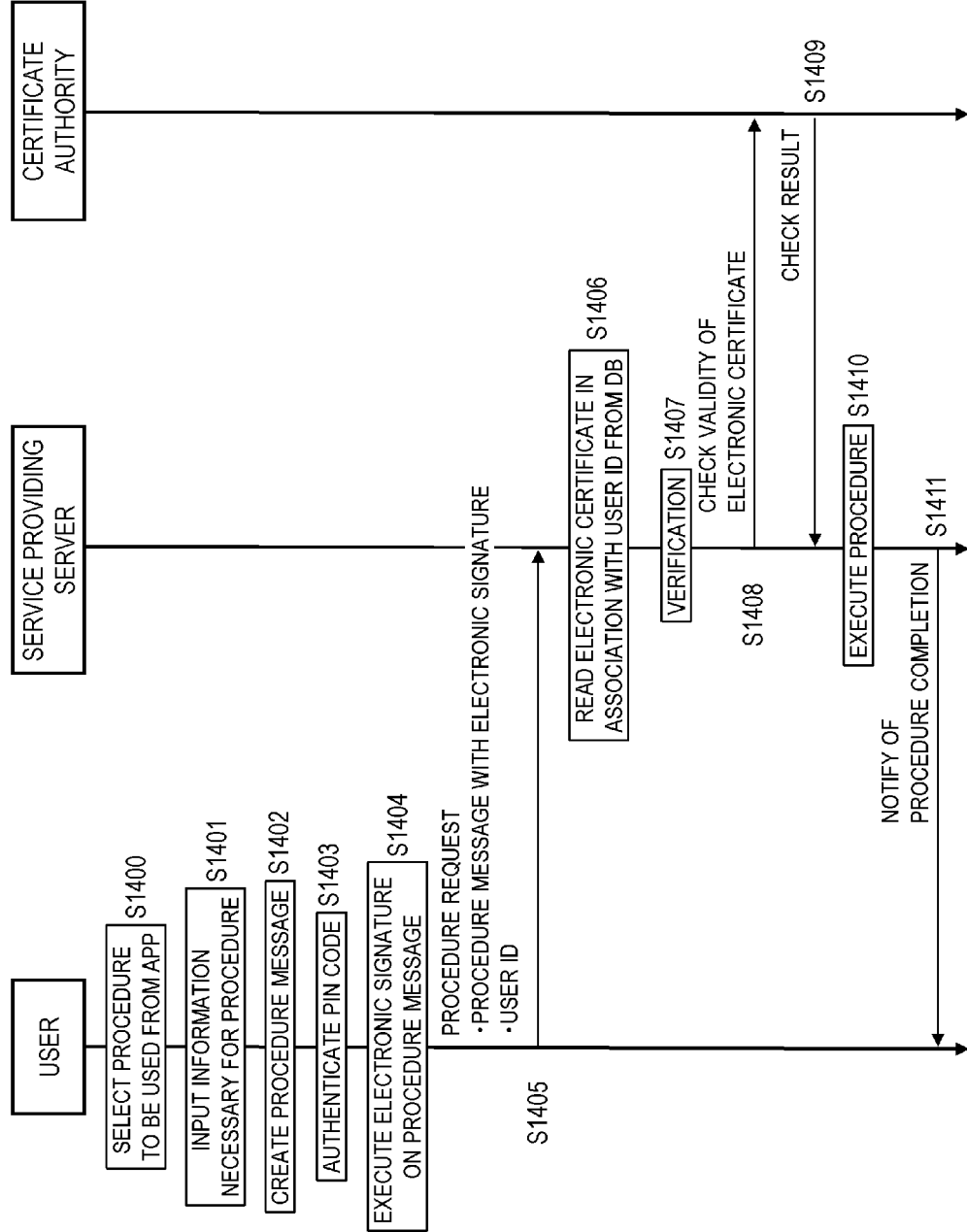
FIG. 14 is a diagram illustrating a flow of a use time of the online service.
Figure 15:
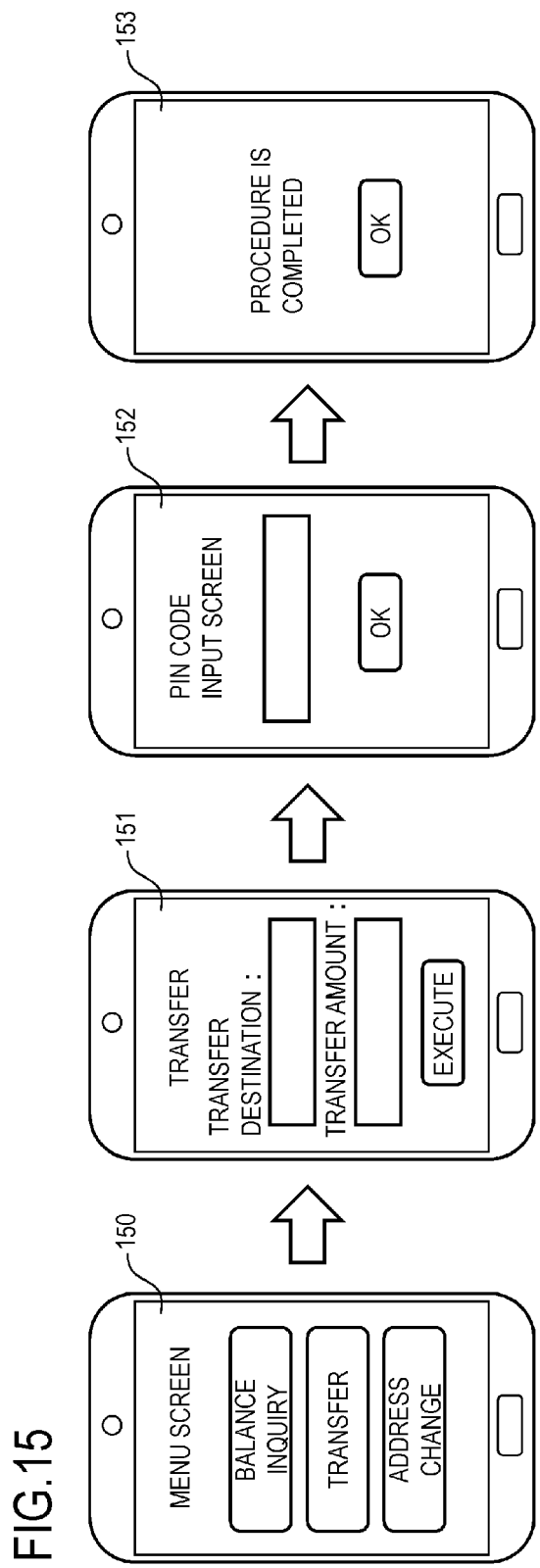
FIG. 15 is a diagram illustrating a screen example displayed on a user device when the online service is used.

An order at the time of use of the online service will be described with reference to FIGS. 14 and 15. FIG. 14 is a diagram illustrating a flow at the time of use of the online service and FIG. 15 is a diagram illustrating an example of a screen displayed on the user device 30. It is assumed that the login in the online service has already been completed and a menu screen 150 is displayed on the user device 30.

When the user selects the procedure which the user desires to use on the menu screen 150, the screen transitions to a detail screen 151 (step S1400). FIG. 15 illustrates an example of a screen when the user selects "Transfer". When the user inputs necessary information (for example, a transfer destination, a transfer amount, and the like) on the detail screen 151 and presses an execution button (step S1401), the main processing unit 600 of the body app 60 creates a procedure message describing information necessary for a transfer procedure (step S1402).

Subsequently, the user authentication unit 601 of the body app 60 displays a PIN code input screen 152 and executes PIN code authentication (step S1403). Since an order of the PIN code authentication is similar to the above-described order, description thereof will be omitted. When the PIN code authentication is successful, the security processing unit 602 of the body app 60 executes the electronic signature in a procedure message using the electronic signature function 622 of the IC card 307 (step S1404). At this time, the electronic signature function 622 may create the electronic signature by calculating a hash value of the procedure message and encrypting the hash value with the private key 611 or may create the electronic signature by encrypting the procedure message with the private key 611. Then, the main processing unit 600 of the body app 60 transmits a procedure request to the service providing server 20 (step S1405). The user ID and the procedure message with the electronic signature are added to the procedure request.

When the procedure request is received, the procedure control unit 203 of the service providing server 20 reads the corresponding electronic certificate from the user information storage unit 201 based on the user ID included in the procedure request (step S1406). Then, the procedure control unit 203 verifies the procedure message with the electronic signature included in the procedure request using the electronic certificate (step S1407). The procedure control unit 203 may inquire of the certificate authority about validity of the electronic certificate as necessary (steps S1408 and S1409). When the procedure message with the electronic signature is verified successfully and the validity of the electronic certificate is confirmed, the procedure control unit 203 determines that the procedure request is a request from the valid user. That is, it is determined that there is no impersonation by a third party and the content of the procedure message is not altered.

Only when it can be confirmed that the procedure request is the request from the valid user, the procedure control unit 203 executes the procedure (transfer or the like) based on the information described in the procedure message (step S1410). When the procedure is completed, the procedure control unit 203 transmits a procedure completion notification to the body app 60 (step S1411). Then, a procedure completion screen 153 is displayed, as illustrated in FIG. 15.

According to the above-described process, when the user merely inputs a PIN code, the online service can be used with a very simple operation, compared to a method of inputting an ID and a password every time in the related art or a method of using a token. Further, since the security function provided by the IC card 307 is used, advanced security is guaranteed and it is possible to prevent impersonation or alteration of the procedure message due to a so-called man-in-the-middle attack.

<Invalidation of IC Card>

In the user device 30 according to the embodiment, the online service cannot be used unless user authentication using a PIN code or biometric information is successful. Accordingly, even when the user device 30 is lost or stolen, a risk of a third party illegally using the user device 30 is small. Since a possibility of PIN code authentication or biometric authentication being broken is not zero, a function of invalidating an IC card, as will be described below, may be preferably mounted.

(1) Self-Destruction Function of IC Card

The self-destruction is an operation in which the processor 411 of the IC card 307 invalidates the function of the IC card 307 by oneself. As specific operation, there is a method or the like of applying a lock so that the function of the IC card 307 cannot be used from the outside (the body app 60) or erasing data (the pair of keys, the electronic certificate, or the like) stored in the memory 413. For example, when a wrong PIN code is input continuously a predetermined number of times or when access to the memory 413 is made in accordance with a method other than an API, the processor 411 may execute self-destruction.

(2) Invalidation of IC Card

When the communication service manager receives a report of loss or theft of the user device 30 or the IC card 307 from the user, the management server may transmit an invalidation signal to the user device 30 or the IC card 307 to invalidate the IC card 307. Alternatively, when the management server monitors a use situation of the IC card 307 and detects abnormality (for example, a non-use state continues for a long time, a use frequency increases abruptly, or much money is remitted), the IC card 307 may be invalidated. Alternatively, when the management server monitors a combination of the IC card 307, the SIM card 306, and the user device 30 and detects disagreement from information managed with IC card management information (for example, when the IC card is extracted alone or together with the SIM card and is inserted into another portable device, the disagreement can occur), the IC card 307 may be invalidated. As the invalidation method, there is a method or the like of applying a lock so that the function of the IC card 307 cannot be used from the outside (the body app 60) or erasing data (the pair of keys, the electronic certificate, or the like) stored in the memory 413.

(3) Invalidation of Electronic Certificate

When the communication service manager receives a report of loss or theft of the user device 30 or the IC card 307 from the user, the management server requests the certificate authority to invalidate the electronic certificate of the user. Alternatively, when the management server monitors a use situation of the IC card 307 or a combination of the IC card, the SIM card, and the user device and detects abnormality, the management server may request the certificate authority to invalidate the electronic certificate when abnormality is detected.

<Other>

The above-described embodiment has been described as one specific example of the present invention. The technical scope of the present invention is not limited to the content of the above-described embodiment and the present invention can be realized in various specific forms within the technical scope. For example, the present invention can be applied not only to the online banking service but also various types of online services. In the above-described embodiment, the sub-SIM type of IC card has been exemplified, but an IC card with the specification of a general micro-SIM or nano-SIM may be inserted (into another slot from a communication SIM card) as long as a portable device includes a plurality of SIM card slots. Alternatively, a type of IC card inserted into a slot other than a SIM card slot may be used or an IC chip (for example, a secure element) embedded in a portable device may be used. In the above-described embodiment, the login request includes only the user ID with the electronic signature, but the electronic certificate may also be transmitted together.

<Secure Element>

Figure 16:
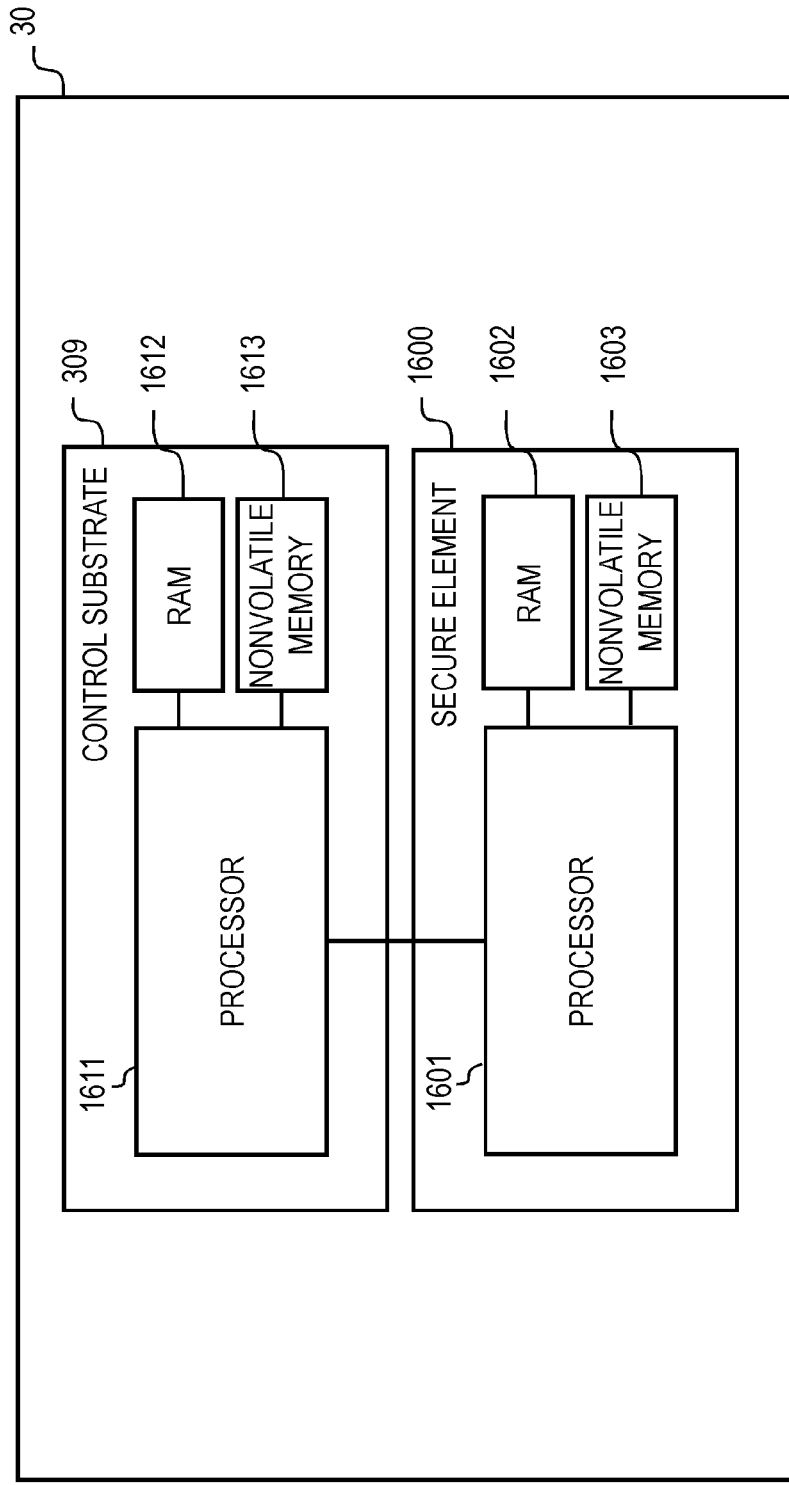
FIG. 16 is a block diagram schematically illustrating a hardware configuration of the user device in which a secure element is embedded.

In the above-described embodiment, an encryption function (a security function) is provided by a sub-SIM type of IC card, but a part or the entirety of the encryption function may be provided by a secure element 1600 embedded in or connected to the user device 30. FIG. 16 is a block diagram schematically illustrating a hardware configuration of the user device 30 in which the secure element 1600 is embedded.

The secure element 1600 is an IC chip that has tolerance (tamper resistant) to analysis of stored data from the outside and is mainly used to manage confidential information. The secure element 1600 is an IC chip independent from a control substrate 309 (including a processor 1611, a RAM 1612, and a nonvolatile memory 1613) of the body of the user device 30, and includes a processor 1601, a RAM 1602, and a nonvolatile memory 1603. The secure element 1600 communicates with the processor 1611 or the like of the body of the user device 30.

When the encryption functions are provided by the secure element 1600, data used for the encryption functions (the personal information 610, the private key 611, the public key 612, the electronic certificate 613, the hash function 614, and the program 615, and the like illustrated in FIG. 6) may be stored in the nonvolatile memory 1603 in the secure element 1600. The encryption functions (the authentication function 620, the encryption function 621, the electronic signature function 622, the personal information changing function 623, the key generation function 624, the public key reading function 625, the electronic certificate writing function 626, the electronic certificate reading function 627, and the like illustrated in FIG. 6) may be provided by allowing the processor 1601 of the secure element 1600 to execute the program 615.

In the above-described configuration, since it is not necessary to carry a device (such as a token of the related art) other than the user device and the online service can be used with the single user device, thereby realizing high convenience. Since automatic login can be executed through only activation of the app and the personal authentication, smart and simple operability can be realized. Further, since the private key stored in the secure element 1600 and the encryption function provided by the secure element 1600 are used, secure data communication can be realized. A private key has a small leakage risk and a private key or an encryption function cannot be used when personal authentication by a PIN code, a password, or biometric authentication is not clear. Therefore, a risk of illegal use by a third party can be as small as possible.

<SIM Card>

Figure 17:
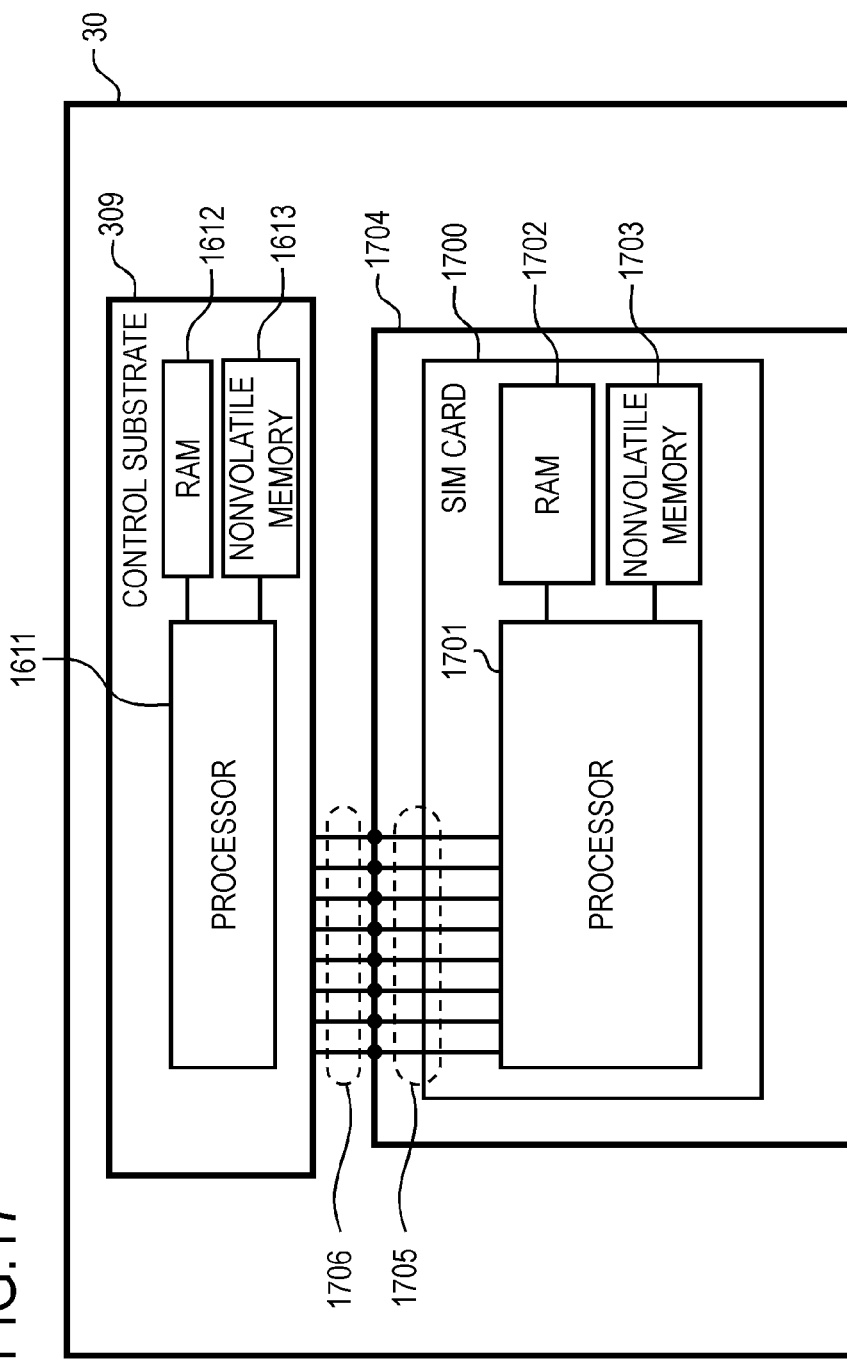
FIG. 17 is a diagram schematically illustrating a hardware configuration of a user device including a SIM card.

Some or all of the encryption functions may be provided by a SIM card embedded in or connected to the user device 30. FIG. 17 is a block diagram schematically illustrating a hardware configuration of the user device 30 including a SIM card 1700.

The SIM card 1700 includes a processor 1701, a RAM 1702, a nonvolatile memory 1703, and eight pins 1705 (electrodes). The nonvolatile memory 1703 stores data such as a unique serial number (ICCID) of the SIM card 1700 and subscriber identification information (IMSI), data used for the encryption function, and a program executed by the processor 1701. The eight pins 1705 includes a power input terminal, a reset terminal, a clock terminal, an earthing terminal, a program voltage input terminal, and I/O terminal, a reserve terminal.

FIG. 17 schematically illustrates a state in which the SIM card 1700 is inserted into a SIM card slot 1704. The pins 1705 of the SIM card 1700 are connected to terminals 1706 of the control substrate 309 of the user device 30.

When a user subscribes a mobile communication service provided by a mobile network operator (MNO) or a mobile virtual network operator (MVNO), the SIM card 1700 is provided from the service provider. The data or the program stored on the SIM card 1700 differ for each service provider, but a basic structure of the SIM card 1700 is identical as long as the SIM card 1700 conforms to an international standard. A standard SIM, a micro-SIM, or a nano-SIM can also be used as the SIM card 1700.

When the encryption functions are provided by the SIM card 1700, data used for the encryption functions (the personal information 610, the private key 611, the public key 612, the electronic certificate 613, the hash function 614, and the program 615, and the like illustrated in FIG. 6) may be stored in the nonvolatile memory 1703 in the SIM card 1700. The encryption functions (the authentication function 620, the encryption function 621, the electronic signature function 622, the personal information changing function 623, the key generation function 624, the public key reading function 625, the electronic certificate writing function 626, the electronic certificate reading function 627, and the like illustrated in FIG. 6) may be provided by allowing the processor 1601 of the SIM card 1700 to execute the program 615.

In the above-described configuration, since it is not necessary to carry a device (such as a token of the related art) other than the user device and the online service can be used with the single user device, thereby realizing high convenience. Since automatic login can be executed through only activation of the app and the personal authentication, smart and simple operability can be realized. Further, since the private key stored in the SIM card 1700 and the encryption function provided by the SIM card 1700 are used, secure data communication can be realized. A private key has a small leakage risk and a private key or an encryption function cannot be used when personal authentication by a PIN code, a password, or biometric authentication is not clear. Therefore, a risk of illegal use by a third party can be as small as possible.

<Post-Installation of Electronic Certificate>

Post-installation of the electronic certificate will be described with reference to FIG. 18. While the IC card on which the electronic certificate is installed is delivered to the user in the service counter in the procedure illustrated in FIG. 8, the electronic certificate can be written on the IC card or the IC chip embedded in or connected to the user device later differently in an order (post-installation) illustrated in FIG. 18.

The applicant (the user) of the IC card first makes a use application of the IC card in the service counter (step S1800). In use application, personal confirmation information and a telephone number of the user are input to a procedure terminal and a personal confirmation document (a driver's license, a resident card, or the like) is presented. The personal confirmation information may include, for example, a name, a sex, the date of birth, and an address. The telephone number is a telephone number assigned to the communication SIM card inserted into the user device 30. The user inputs the personal confirmation information and the telephone number to the procedure terminal (step S1801). The personal confirmation document may become electronic data (for example, image data) obtained with a camera or a scanner included in the procedure terminal. The procedure terminal transmits the personal confirmation information, the personal confirmation document, and the telephone number to the communication service manager (step S1802). Here, the procedure in which the user operates the procedure terminal to input necessary information is assumed. However, as in the case of FIG. 8, the staff may input the necessary information as a proxy of the user.

On the other hand, the user installs a predetermined program for installing and activating the encryption function (referred to as a "setup program") on the user device 30 (the body app 60 illustrated in FIG. 6 may also serve as the setup program). The processor of the user device 30 reads the telephone number and the IMSI from the communication SIM card in accordance with the setup program (step S1803) and transmits the telephone number and the IMSI of the SIM card to the communication service manager (step S1804).

Thereafter, the user receives the IC card and inserts the IC card into the user device 30. In the memory of the IC card at this stage, only "the hash function and the program" are stored among the information illustrated in FIG. 6 and "the private key, the public key, and the electronic certificate" which are the information associated with the user" have not been stored.

The communication service manager takes correspondence between the information received from the user device 30 and the information received from the procedure terminal using the telephone number as a key and stores the personal confirmation information, the personal confirmation document, and the telephone number and the IMSI of the SIM card in association. Then, the communication service manager executes personal confirmation by collating the personal confirmation information with the personal confirmation document and checking whether there is disagreement between the information (step S1806). After the personal confirmation completion, the communication service manager transmits a certificate issuing request and the telephone number and/or the IMSI of the communication SIM card received from the user device 30 to the certificate authority (step S1807). In this example, the user device 30 indirectly notifies the certificate authority of the telephone number and/or the IMSI via the communication service manager, but the user device 30 may directly notify the certificate authority of the telephone number and/or the IMSI. In this example, the electronic data of the personal confirmation document is transmitted to the communication service manager via a network. However, when the original document confirmation of the personal confirmation document is necessary, the original document of the personal confirmation document may be presented or posted from the service counter or the user to the communication service manager. In this case, after the communication service manager receives the original document of the personal confirmation document, the personal confirmation process of step S1806 starts.

The certificate authority receiving the certificate issuing request creates a user identification code and transmits the user identification code to a transmission destination identified with the IMSI or the telephone number (step S1808). As a transmitter for the user identification code, for example, a short message service (SMS) can be used. The setup program of the user device 30 instructs the key generation function 624 of the IC card to create the pair of keys so that private key and the public key are created (step S1809). The order of the transmission of the user identification code (step S1808) and the generation of the pair of keys (step S1809) may be random.

Thereafter, the setup program of the user device 30 reads the public key from the memory of the IC card using the public key reading function 625 of the IC card, creates a CSR (Certificate Signing Request) of the electronic certificate from the public key and the user identification code, and transmits the CSR to the predetermined certificate authority (step S1810).

The certificate authority issues the electronic certificate of the public key of the user in accordance with the received CSR and transmits the electronic certificate to the user device 30 via the wired Internet or the wireless Internet (step S1811). At this time, the electronic certificate may be transmitted using HTTP (Hypertext Transfer Protocol) or HTTPS (Hypertext Transfer Protocol Secure) as a protocol. A process of receiving the electronic certificate from the certificate authority is also executed in accordance with the setup program of the user device 30.

The electronic certificate is used to electronically prove that the user is himself or herself. In the embodiment, a public key certificate in which the public key and identification information of the owner are bound is used as the electronic certificate. In the case of X.509 designed by ITU-T, the electronic certificate is data that includes the public key, owner information (which corresponds to personal confirmation information), an electronic signature of the certificate authority, a validated date of the electronic certificate, and information of an issuer. The electronic signature of the certificate authority is an electronic signature obtained by encrypting a hash value created from the owner information with the public key included in the electronic certificate and the private key of the certificate authority.

A timing at which the certificate authority transmits the electronic certificate to the user device 30 or a timing at which the user device 30 receives the electronic certificate from the certificate authority can be controlled to any timing. For example, the setup program of the user device 30 may communicate with the certificate authority periodically in the background, check whether to complete the issuing of the electronic certificate, and download the electronic certificate in a preparation stage. Alternatively, when the certificate authority receives the CSR, the certificate authority may notify the user device 30 of an issue-scheduled date of the electronic certificate (a date at which the electronic certificate can be downloaded). In this case, the setup program of the user device 30 may acquire access the certificate authority and acquire the electronic certificate after the notified issue-scheduled date passes. Alternatively, the certificate authority notifies the setup program of the user device 30 that the issuing of the electronic certificate is completed by using the mechanism of an SMS, a push notification, or the like and may transmit the electronic certificates to the setup program which has respond. In this way, by allowing the request for issuing the electronic certificate and the transmission of the electronic certificate to the user device to be executed at different timings, an operation can be executed without being limited to a time or a place, for example, in such a way that work until personal confirmation is executed in a service counter of a store and a flow after the issuing of the electronic certificate is executed at a period of time desired by the user. Accordingly, it is possible to achieve an improvement in the installation of the encryption function and convenience of the activation. In the case of any method, the setup program of the user device 30 may prove that a terminal is the terminal of the applicant (a valid terminal) to the certificate authority by notifying the certificate authority of the telephone number and/or the IMSI of the communication SIM card together with the user identification code. Thus, even when the request for issuing the electronic certificate and the transmission of the electronic certificate to the user device are executed at different timings, it is possible to prevent the electronic certificate from being erroneously transmitted to a terminal of another person. Since it is possible to prevent the electronic certificate from being acquired illegally by a malicious person, the issuing and the transmission of the electronic certificate can be safely executed.

The setup program of the user device 30 writes the electronic certificate on the memory of the IC card using the electronic certificate writing function 626 of the IC card (step S1812). In this stage, on the memory of the IC card, the personal information, the private key, the public key, and the electronic certificate which are data necessary for security processing are arranged. At this time, the electronic certificate may be stored in the SIM card or the secure element inserted into the user device 30.

The setup program of the user device 30 reads a "serial number" and a "manufacturing number" from the IC card and reads a "telephone number" and an "IMSI" from the communication SIM card. The setup program acquires an IMEI (International Mobile Equipment Identity) as information regarding the user device. The setup program transmits a request for registering the IC card to the management server of the communication service manager together with the information. When the management server receives the request for registering the IC card from the user device 30, the management server registers information regarding the IC card, the SIM card, and the user device included in the request in an IC card management database (step S1814).

When the registration of the IC card management information is completed, the management server notifies the user device 30 of registration completion. Thus, the setup of the user device 30 is completed and the IC card enters a usable state (an activation state).

Figure 18:
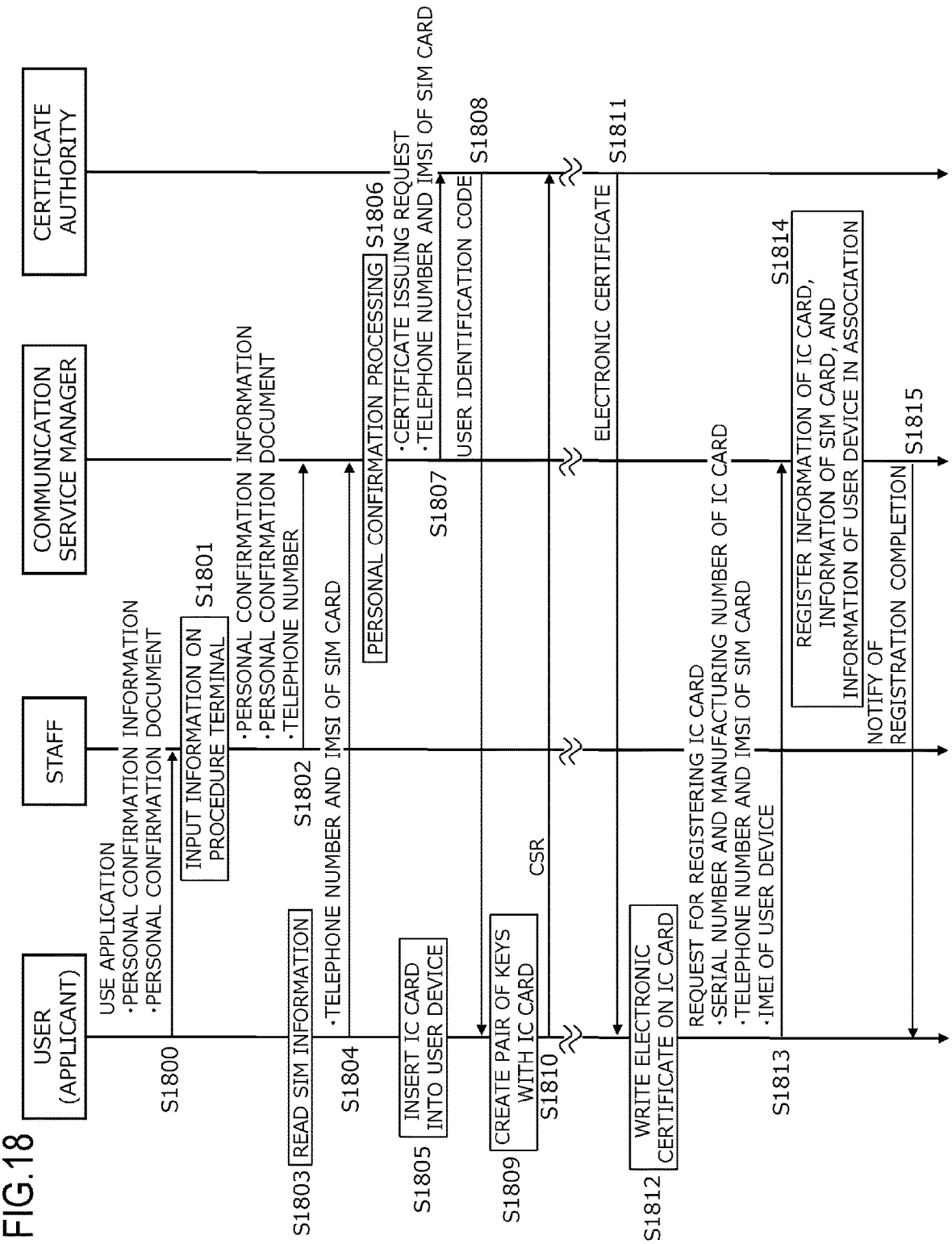
FIG. 18 is a diagram illustrating post-installation of an electronic certificate.

The issuing procedure illustrated in FIG. 18 is merely an example and the issuing procedure may be executed in a different procedure. For example, the user identification code may be transmitted to the user device through data communication executed via the Internet instead of an SMS. At this time, an IP address of the user device may be identified using the IMSI of the communication SIM card. When biometric authentication is used rather than the PIN code authentication, biometric information (a facial image, a voiceprint, an iris, a fingerprint, or the like) registered as the personal information on the IC card may be input using the procedure terminal or the like.

<Identification of IC Chip>

Figure 19:
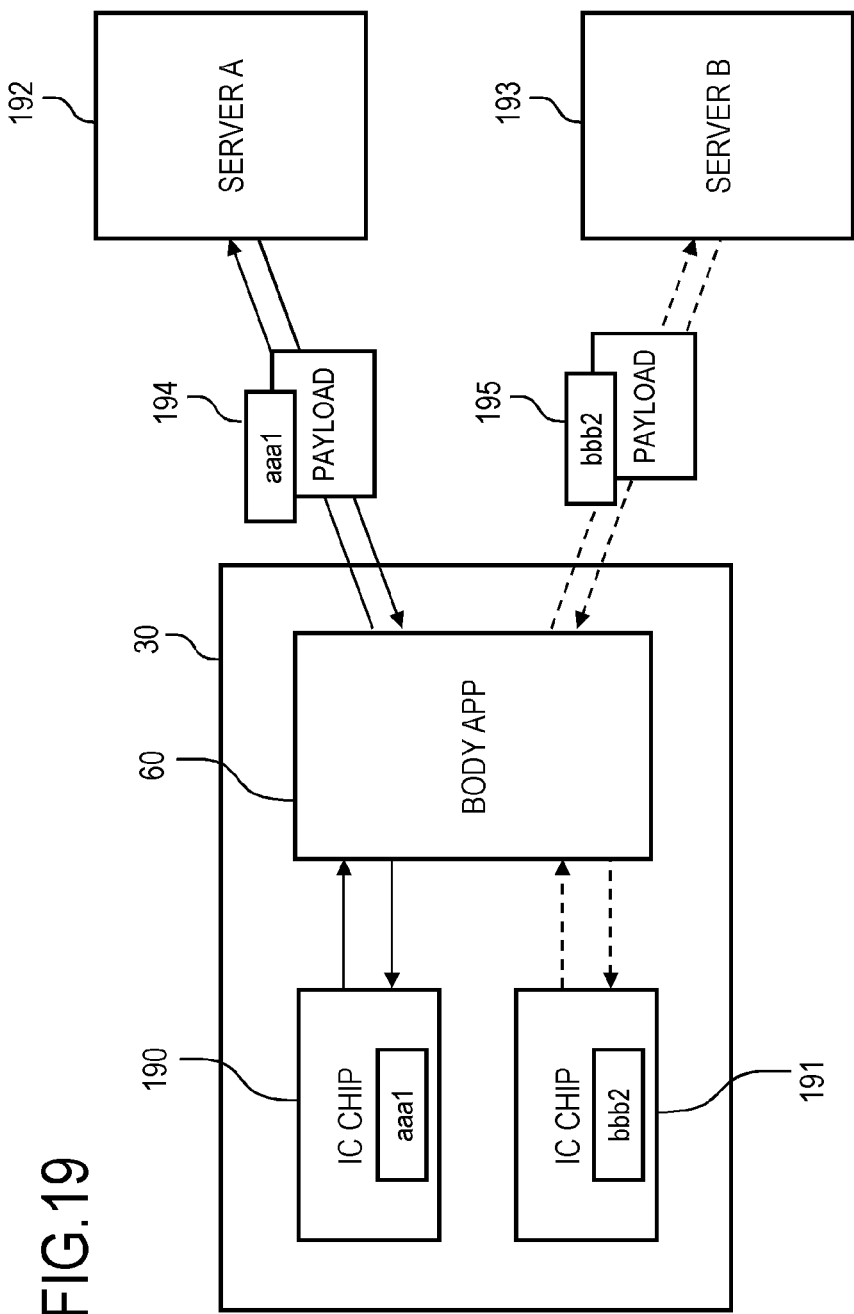
FIG. 19 is a diagram illustrating an example of a mechanism for identifying an IC chip used in a user device when communication is executed between a user device and a server.

FIG. 19 is a diagram illustrating an example of a mechanism that identifies an IC chip used in the user device when communication is executed between the user device and the service providing server. In the example of FIG. 19, it is assumed that the user device 30 includes two IC chips 190 and 191, the IC chip 190 is used to communicate with a server A192, and the IC chip 191 is used to communicate with a server B193. As the IC chips 190 and 191, any type of IC chip may be used in addition to the sub-SIM type of IC card, the communication SIM card, the secure element, and the like described above.

A unique ID is assigned to each of the IC chips 190 and 191. The ID is identification information with which the IC chip can be uniquely identified and is stored in a memory embedded in the IC chip. In the example of FIG. 19, the ID of the IC chip 190 is "aaa1" and the ID of the IC chip 191 is "bbb2". Any information may be used as the ID as long as the ID does not overlap the ID of another IC chip. For example, an IMSI (International Mobile Subscriber Identity), an ICCID (Integrated Circuit Card ID), a telephone number, a serial number, a manufacturing number, or the like can be used as the ID. An IP address associated with the IMSI or the like may be used as the ID.

The body app 60 of the user device 30 adds the ID "aaa1" of the IC chip 190 as information regarding a transmission source to the header or the like of data (a communication packet) 194 to be transmitted to the server A192. Thus, the server A192 can identify the IC chip 190 used in the user device 30. The server A192 also adds the ID "aaa1" of the IC chip 190 as information regarding a transmission destination to the header of data (a communication packet) 194 to be transmitted to the user device 30. The body app 60 can identify the IC chip 190 in charge of processing the data received from the server A192 using the ID.

The body app 60 of the user device 30 adds the ID "bbb2" of the IC chip 191 as information regarding a transmission source to the header or the like of data (a communication packet) 195 to be transmitted to the server B193. Thus, the server B193 can identify the IC chip 191 used in the user device 30. The server B193 also adds the ID "bbb2" of the IC chip 191 as information regarding a transmission destination to the header of data (a communication packet) 195 to be transmitted to the user device 30. The body app 60 can identify the IC chip 191 in charge of processing the data received from the server A193 using the ID.

In the above-described configuration, since the data for identifying the IC chip which is a transmission source or a transmission destination is transmitted and received between the user device 30 and each server, it is possible to further improve communication safety. As illustrated in FIG. 19, when the number of pairs of combinations of the IC chips and the servers is plural, the body app 60 can select (switch) the IC chips 190 and 191 used to process the pieces of data 194 195 based on the ID information included in the headers of the pieces of data 194 and 195. This advantage is particularly considerable, for example, when the user device 30 includes the plurality of IC chips or the user device 30 executes secure communication with the plurality of servers.

In the example of FIG. 19, the correspondence between the IC chip and the server is achieved by adding the identification information of the IC chip to the data transmitted and received between the user device 30 and each server, but similar correspondence may be realized in accordance with another method. For example, as illustrated in FIG. 20, the body app 60 may have correspondence information 196 for correspondence between the IC chip and the server (hereinafter referred to as a "correspondence table 196"). In the correspondence table 196, for example, the identification information of an IC chip may correspond to the identification information of the server executing communication using the encryption function of the IC chip. As the identification information of the IC chip, for example, an IMSI (International Mobile Subscriber Identity), an ICCID (Integrated Circuit Card ID), a telephone number, a serial number, a manufacturing number, an IP address associated with the IMSI or the like can be used. As the identification information of the server, for example, an IP address, a URL, or the like of the server may be used. In the case of the method illustrated in FIG. 20, the body app 60 can identify the IC chip used for communication with the server based on the correspondence table 196 when communication with the server is executed. Accordingly, similar advantageous effects to those of the method in FIG. 19 can be obtained.

In each of the above-described embodiments, when the user device 30 executes data communication with each server or the certificate authority via the Internet, the SIM card (that is, the user device 30) serving as a transmission source or a transmission destination of data is identified with an IMSI of the communication SIM included in the user device 30 or an IP address associated with the IMSI. The IP address may be a dynamically assignable IP address or a fixed IP address.

REFERENCE SIGNS LIST

20 Service providing server
30 User device
60 Application program
70 IC card issuing terminal
306 SIM card
307 IC card (sub-SIM)
308 SIM card slot

The invention claimed is:

1. An online service providing system that provides a mechanism capable of using an online service safely on a portable device, the online service providing system comprising:
    a service providing server configured to provide a registered user with the online service through the Internet;
    a plurality of integrated circuit (IC) chips provided in a user device which is a portable device possessed by the user; and
    an application program that is executed by a body processor included in the user device and causes the user device to function as a terminal using the online service,
    wherein each of the plurality of IC chips includes:

a memory that non-transitorily stores at least personal information used for user authentication to confirm validity of a party using the user device, a private key of the user, a public key of the user paired with the private key, and an electronic certificate of the user including the public key, wherein the personal information is biometric information of the user including a facial image, a voiceprint, an iris, a fingerprint, or a vein, and a processor that has at least an authentication function of executing the user authentication by collating information given from the application program with the personal information and an electronic signature function of executing an electronic signature on data given from the application program using the private key, wherein the application program causes the user device to function as:

a user authentication unit configured to execute the user authentication using the authentication function of the IC chip based on information acquired from the party using the user device, and a transmission unit configured to create the electronic signature using the electronic signature function of the IC chip in a case where the party using the user device is confirmed to be valid through the user authentication, and transmit a login request including the created electronic signature to the service providing server through the Internet, and wherein the service providing server includes:

a user information storage that stores the electronic certificate of the user as information regarding the user, and a server processor that functions as a login control unit configured to check validity of the login request by verifying the electronic signature included in the login request using the electronic certificate of the user in a case where the login request is received from the user device, and permit use of the online service on the user device in a case where the login request is confirmed to be valid, wherein the plurality of IC chips have different identification information from each other, and wherein the user device and the service providing server execute communication in which the IC chip to be used is identified with the identification information, wherein each IC chip of the plurality of IC chips as an area that is inaccessible from outside in the memory, and wherein each IC chip of the plurality of IC chips stores at least the personal information, which is data used by the user authentication unit for the user authentication in order to allow the party using the user device to use the electronic signature function of the IC chip, and the private key in its own area that is inaccessible from the outside.

2. The online service providing system according to claim 1, wherein the plurality of IC chips include an IC chip that is inserted into a SIM card slot in a state in which the IC chip is stacked with and attached to a communication SIM card.

3. The online service providing system according to claim 1, wherein the plurality of IC chips include an IC chip that serves as a communication SIM card.

4. The online service providing system according to claim 1, wherein the plurality of IC chips include a secure element.

5. The online service providing system according to claim 1, wherein the processors of the IC chips have a key generation function of generating the private key and the public key.

6. The online service providing system according to claim 1, wherein the user device and the service providing server execute communication in which the SIM card is identified by an IMSI of the communication SIM card included in the user device or an IP address corresponding to the IMSI.

7. The online service providing system according to claim 1, further comprising: a setup program that is executed by the body processor included in the user device and provides a function of setting up the IC chips.

8. The online service providing system according to claim 7, wherein the setup program causes the user device to function as:

a unit configured to transmit a request for issuing an electronic certificate to a certificate authority, and a unit configured to receive the electronic certificate from the certificate authority and store the electronic certificate in the memories of the IC chips.

9. The online service providing system according to claim 8, wherein the setup program causes the user device to function as:

a unit configured to read a telephone number and/or the IMSI from the communication SIM card of the user device, a unit configured to notify the certificate authority of the telephone number and/or the IMSI, and a unit configured to receive information transmitted to a destination identified by the telephone number or the IMSI from the certificate authority.

10. The online service providing system according to claim 9, wherein the information is transmitted to the user device by an SMS, or wherein the information is transmitted to the user device through data communication via the Internet.

11. A non-transitory computer-readable medium storing an application program that is executed by a body processor included in a user device which is a portable device possessed by a user and causes the user device to function as a terminal for utilizing an online service provided through the Internet by a service providing server, wherein the user device has a plurality of integrated circuit (IC) chips, wherein each of the plurality of IC chips includes:

a memory that non-transitorily stores at least personal information used for user authentication to confirm validity of a party using the user device, a private key of the user, a public key of the user paired with the private key, and an electronic certificate of the user including the public key, wherein the personal information is biometric information of the user including a facial image, a voiceprint, an iris, a fingerprint, or a vein, and a processor that has at least an authentication function of executing the user authentication by collating information given from the application program with the personal information and an electronic signature function of executing an electronic signature on data given from the application program using the private key, wherein the application program causes the user device to function as:

a user authentication unit configured to execute the user authentication using the authentication function of the IC chip based on information acquired from the party using the user device, and a transmission unit configured to create the electronic signature using the electronic signature function of the IC chip in a case where the party using the user device is confirmed to be valid through the user authentication, and transmit a login request including the created electronic signature to the service providing server through the Internet, wherein the plurality of IC chips have different identification information from each other, and wherein the user device and the service providing server execute communication in which the IC chip to be used is identified with the identification information, wherein each IC chip of the plurality of IC chips as an area that is inaccessible from outside in the memory, and wherein each IC chip of the plurality of IC chips stores at least the personal information, which is data used by the user authentication unit for the user authentication in order to allow the party using the user device to use the electronic signature function of the IC chip, and the private key in its own area that is inaccessible from the outside.

\* \* \* \* \*